(12) United States Patent
Edler et al.

(10) Patent No.: US 12,112,765 B2
(45) Date of Patent: **\*Oct. 8, 2024**

(54) AUDIO ENCODER, AUDIO DECODER, METHOD FOR ENCODING AN AUDIO SIGNAL AND METHOD FOR DECODING AN ENCODED AUDIO SIGNAL

(71) Applicant: Fraunhofer-Gesellschaft zur Foerderung der angewandten Forschung e.V., Munich (DE)

(72) Inventors: Bernd Edler, Fuerth (DE); Christian Helmrich, Berlin (DE); Max Neuendorf, Nuremberg (DE); Benjamin Schubert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 489 days.

This patent is subject to a terminal disclaimer.

(21) Appl. No.: 16/802,397

(22) Filed: Feb. 26, 2020

(65) Prior Publication Data

US 2020/0227058 A1   Jul. 16, 2020

Related U.S. Application Data

(63) Continuation of application No. 15/697,042, filed on Sep. 6, 2017, now Pat. No. 10,600,428, which is a (Continued)

(30) Foreign Application Priority Data

Mar. 9, 2015 (EP) .................................... 15158253
Jun. 17, 2015 (WO) .................. PCT/EP2015/063658

(51) Int. Cl.
*G10L 19/032* (2013.01)
*G10L 19/02* (2013.01)
(Continued)

(52) U.S. Cl.
CPC ............ *G10L 19/032* (2013.01); *G10L 19/02* (2013.01); *H04N 19/547* (2014.11); *H04N 19/635* (2014.11)

(58) Field of Classification Search
CPC .............................. G10L 19/02; G10L 19/032
See application file for complete search history.

(56) References Cited

U.S. PATENT DOCUMENTS 3,959,592 A    5/1976  Ehrat
4,757,517 A    7/1988  Yatsuzuka
(Continued)

FOREIGN PATENT DOCUMENTS

CA    2896814 A1 *   8/2014    ............. G10L 19/03
CN    1114122 A    12/1995
(Continued)

OTHER PUBLICATIONS

Hamdy, K. N, et al., "Low bit rate high quality audio coding with combined harmonic and wavelet representations", 1996 IEEE International Conference on Acoustics, Speech, and Signal Processing, Conference Proceedings vol. 2, pp. 1045-1048, 1045-1048.
(Continued)

*Primary Examiner* — Daniel C Washburn
*Assistant Examiner* — Oluwadamilola M Ogunbiyi
(74) *Attorney, Agent, or Firm* — PERKINS COIE LLP; Michael A. Glenn

(57) ABSTRACT

An encoder for encoding an audio signal is configured to encode the audio signal in a transform domain or filter-bank domain, is configured to determine spectral coefficients of the audio signal for a current frame and at least one previous frame, and is configured to selectively apply predictive encoding to a plurality of individual spectral coefficients or groups of spectral coefficients which are separated by at least one spectral coefficient.

49 Claims, 5 Drawing Sheets

300

Determining spectral coefficients of the audio signal for a current frame and at least one previous frame; and — 302 selectively applying predictive encoding to a plurality of individual spectral coefficients or groups of spectral coefficients which are separated by at least one spectral coefficient. — 304

Related U.S. Application Data continuation of application No. PCT/EP2016/054831, filed on Mar. 7, 2016.

(51) Int. Cl.
*H04N 19/547* (2014.01)
*H04N 19/635* (2014.01)

(56) References Cited

U.S. PATENT DOCUMENTS

| | | | |
|---|---|---|---|
| 4,885,790 A * | 12/1989 | McAulay | G10L 19/02 |
| | | | 704/E19.01 |
| 5,235,670 A * | 8/1993 | Lin | G10L 19/06 |
| | | | 704/E19.024 |
| 5,502,713 A | 3/1996 | Lagerqvist et al. | |
| 5,619,566 A | 4/1997 | Fogel | |
| 5,717,821 A | 2/1998 | Tsutsui et al. | |
| 5,781,888 A | 7/1998 | Herre | |
| 5,926,788 A | 7/1999 | Nishiguchi | |
| 5,950,153 A | 9/1999 | Ohmori et al. | |
| 5,956,672 A * | 9/1999 | Serizawa | G10L 19/07 |
| | | | 704/E19.025 |
| 5,978,759 A | 11/1999 | Tsushima et al. | |
| 6,041,295 A | 3/2000 | Hinderks | |
| 6,061,555 A | 5/2000 | Bultman et al. | |
| 6,104,321 A | 8/2000 | Akagiri | |
| 6,161,089 A | 12/2000 | Hardwick | |
| 6,289,308 B1 | 9/2001 | Lokhoff | |
| 6,301,265 B1 * | 10/2001 | Kleider | H04L 69/40 |
| | | | 370/465 |
| 6,424,939 B1 | 7/2002 | Herre et al. | |
| 6,502,069 B1 | 12/2002 | Grill et al. | |
| 6,636,829 B1 * | 10/2003 | Benyassine | G10L 19/07 |
| | | | 704/219 |
| 6,680,972 B1 | 1/2004 | Liljeryd et al. | |
| 6,708,145 B1 | 3/2004 | Liljeryd et al. | |
| 6,799,164 B1 | 9/2004 | Araki | |
| 6,826,526 B1 | 11/2004 | Norimatsu et al. | |
| 6,963,405 B1 | 11/2005 | Wheel et al. | |
| 7,206,740 B2 | 4/2007 | Thyssen et al. | |
| 7,246,065 B2 | 7/2007 | Tanaka et al. | |
| 7,318,027 B2 | 1/2008 | Lennon et al. | |
| 7,328,161 B2 | 2/2008 | Oh | |
| 7,447,317 B2 | 11/2008 | Herre et al. | |
| 7,447,631 B2 | 11/2008 | Truman et al. | |
| 7,460,990 B2 | 12/2008 | Mehrotra et al. | |
| 7,483,758 B2 | 1/2009 | Liljeryd et al. | |
| 7,502,743 B2 | 3/2009 | Thumpudi et al. | |
| 7,539,612 B2 | 5/2009 | Thumpudi et al. | |
| 7,739,119 B2 | 6/2010 | Venkatesha Rao et al. | |
| 7,756,713 B2 | 7/2010 | Chong et al. | |
| 7,761,290 B2 | 7/2010 | Koishida et al. | |
| 7,761,303 B2 | 7/2010 | Pang et al. | |
| 7,801,735 B2 | 9/2010 | Thumpudi et al. | |
| 7,917,369 B2 | 3/2011 | Chen et al. | |
| 7,930,171 B2 | 4/2011 | Chen et al. | |
| 7,945,449 B2 | 5/2011 | Vinton et al. | |
| 8,078,474 B2 | 12/2011 | Vos et al. | |
| 8,112,284 B2 | 2/2012 | Kjörling et al. | |
| 8,135,047 B2 | 3/2012 | Rajendran et al. | |
| 8,214,202 B2 | 7/2012 | Bruhn | |
| 8,255,229 B2 | 8/2012 | Koishida et al. | |
| 8,412,365 B2 | 4/2013 | Liljeryd et al. | |
| 8,428,957 B2 | 4/2013 | Garudadri et al. | |
| 8,473,301 B2 | 6/2013 | Chen et al. | |
| 8,484,020 B2 | 7/2013 | Krishnan et al. | |
| 8,489,403 B1 | 7/2013 | Griffin et al. | |
| 8,554,569 B2 | 10/2013 | Chen et al. | |
| 8,655,670 B2 | 2/2014 | Purnhagen et al. | |
| 8,892,448 B2 | 11/2014 | Vos et al. | |
| 9,015,041 B2 | 4/2015 | Bayer et al. | |
| 9,047,875 B2 | 6/2015 | Gao | |
| 9,111,427 B2 | 8/2015 | Know et al. | |
| 9,111,535 B2 | 8/2015 | Yang et al. | |
| 9,390,717 B2 | 7/2016 | Yamamoto et al. | |
| 9,646,624 B2 | 5/2017 | Disch et al. | |
| 10,600,428 B2 | 3/2020 | Edler et al. | |
| 2002/0065648 A1 | 5/2002 | Amano | |
| 2002/0128839 A1 | 9/2002 | Lindgren et al. | |
| 2003/0009327 A1 | 1/2003 | Nilsson et al. | |
| 2003/0014136 A1 | 1/2003 | Wang et al. | |
| 2003/0074191 A1 | 4/2003 | Byrnes et al. | |
| 2003/0115042 A1 | 6/2003 | Chen et al. | |
| 2003/0138046 A1 | 7/2003 | Base et al. | |
| 2003/0220800 A1 | 11/2003 | Budnikov et al. | |
| 2004/0008615 A1 | 1/2004 | Oh | |
| 2004/0024588 A1 | 2/2004 | Watson et al. | |
| 2004/0028244 A1 | 2/2004 | Tsushima et al. | |
| 2004/0054525 A1 | 3/2004 | Sekiguchi | |
| 2004/0153316 A1 | 8/2004 | Hardwick | |
| 2005/0004793 A1 | 1/2005 | Ojala et al. | |
| 2005/0021329 A1 * | 1/2005 | Lin | G10L 19/06 |
| | | | 704/E19.024 |
| 2005/0036633 A1 | 2/2005 | Jeon et al. | |
| 2005/0074127 A1 | 4/2005 | Herre et al. | |
| 2005/0078754 A1 * | 4/2005 | Liang | H04N 19/93 |
| | | | 375/E7.199 |
| 2005/0096917 A1 | 5/2005 | Kjorling et al. | |
| 2005/0141721 A1 | 6/2005 | Aarts et al. | |
| 2005/0157891 A1 | 7/2005 | Johansen | |
| 2005/0163234 A1 | 7/2005 | Taleb | |
| 2005/0165611 A1 | 7/2005 | Mehrotra et al. | |
| 2005/0216262 A1 | 9/2005 | Fejzo | |
| 2005/0278171 A1 | 12/2005 | Suppappola et al. | |
| 2006/0006103 A1 | 1/2006 | Sirota et al. | |
| 2006/0031075 A1 | 2/2006 | Oh et al. | |
| 2006/0095269 A1 | 5/2006 | Smith et al. | |
| 2006/0122828 A1 | 6/2006 | Lee et al. | |
| 2006/0171685 A1 * | 8/2006 | Chen | H04N 19/12 |
| | | | 386/346 |
| 2006/0206334 A1 | 9/2006 | Kapoor et al. | |
| 2006/0210180 A1 | 9/2006 | Geiger et al. | |
| 2006/0265210 A1 | 11/2006 | Ramakrishnan et al. | |
| 2006/0282263 A1 | 12/2006 | Vos et al. | |
| 2007/0016402 A1 | 1/2007 | Schuller et al. | |
| 2007/0016403 A1 | 1/2007 | Schuller et al. | |
| 2007/0016406 A1 * | 1/2007 | Thumpudi | G10L 19/008 |
| | | | 704/E19.02 |
| 2007/0016411 A1 | 1/2007 | Kim et al. | |
| 2007/0016415 A1 * | 1/2007 | Thumpudi | G10L 19/03 |
| | | | 704/E19.014 |
| 2007/0027677 A1 | 2/2007 | Ouyang et al. | |
| 2007/0043575 A1 | 2/2007 | Onuma et al. | |
| 2007/0067166 A1 * | 3/2007 | Pan | G10L 19/038 |
| | | | 704/E19.017 |
| 2007/0100607 A1 | 5/2007 | Villemoes | |
| 2007/0112559 A1 | 5/2007 | Schuijers et al. | |
| 2007/0129036 A1 | 6/2007 | Arora | |
| 2007/0147518 A1 | 6/2007 | Bessette | |
| 2007/0196022 A1 | 8/2007 | Geiger et al. | |
| 2007/0223577 A1 | 9/2007 | Ehara et al. | |
| 2007/0282603 A1 | 12/2007 | Bessette | |
| 2008/0027711 A1 | 1/2008 | Rajendran et al. | |
| 2008/0027717 A1 | 1/2008 | Rajendran et al. | |
| 2008/0040103 A1 | 2/2008 | Vinton et al. | |
| 2008/0052066 A1 | 2/2008 | Oshikiri et al. | |
| 2008/0159393 A1 * | 7/2008 | Lee | H04N 19/61 |
| | | | 375/E7.106 |
| 2008/0208538 A1 | 8/2008 | Visser et al. | |
| 2008/0208600 A1 | 8/2008 | Pang et al. | |
| 2008/0262835 A1 | 10/2008 | Oshikiri | |
| 2008/0262853 A1 | 10/2008 | Jung et al. | |
| 2008/0270125 A1 | 10/2008 | Choo et al. | |
| 2008/0281604 A1 | 11/2008 | Choo et al. | |
| 2008/0312758 A1 | 12/2008 | Koishida et al. | |
| 2008/0312914 A1 | 12/2008 | Rajendran et al. | |
| 2009/0006103 A1 | 1/2009 | Koishida et al. | |
| 2009/0132261 A1 | 5/2009 | Kjorling et al. | |
| 2009/0144055 A1 | 6/2009 | Davidson et al. | |
| 2009/0144062 A1 | 6/2009 | Ramabadran et al. | |
| 2009/0177478 A1 | 7/2009 | Jax et al. | |
| 2009/0180531 A1 | 7/2009 | Wein et al. | |
| 2009/0192789 A1 | 7/2009 | Lee et al. | |
| 2009/0216527 A1 | 8/2009 | Oshikiri | |

(56) References Cited

U.S. PATENT DOCUMENTS

| | | |
|---|---|---|
| 2009/0226010 A1 | 9/2009 | Schnell et al. |
| 2009/0228285 A1 | 9/2009 | Schnell et al. |
| 2009/0234644 A1 | 9/2009 | Reznik et al. |
| 2009/0240491 A1 | 9/2009 | Reznik |
| 2009/0263036 A1 | 10/2009 | Tanaka |
| 2009/0292537 A1 | 11/2009 | Ehara et al. |
| 2010/0023322 A1 | 1/2010 | Schnell et al. |
| 2010/0046626 A1* | 2/2010 | Tu ................ H04N 19/61 375/240.18 |
| 2010/0063802 A1 | 3/2010 | Gao |
| 2010/0063808 A1 | 3/2010 | Gao et al. |
| 2010/0070270 A1 | 3/2010 | Gao |
| 2010/0177903 A1 | 7/2010 | Vinton et al. |
| 2010/0185261 A1 | 7/2010 | Schleich |
| 2010/0211399 A1 | 8/2010 | Liljeryd et al. |
| 2010/0211400 A1 | 8/2010 | Oh et al. |
| 2010/0241436 A1 | 9/2010 | Kim et al. |
| 2010/0241437 A1 | 9/2010 | Taleb et al. |
| 2010/0280823 A1 | 11/2010 | Shlomot et al. |
| 2010/0286981 A1 | 11/2010 | Krini et al. |
| 2011/0002266 A1 | 1/2011 | Gao |
| 2011/0015768 A1 | 1/2011 | Lim et al. |
| 2011/0046945 A1 | 2/2011 | Li et al. |
| 2011/0093276 A1 | 4/2011 | Rämö et al. |
| 2011/0099004 A1 | 4/2011 | Krishnan et al. |
| 2011/0106545 A1 | 5/2011 | Disch et al. |
| 2011/0125505 A1 | 5/2011 | Vaillancourt et al. |
| 2011/0170711 A1 | 7/2011 | Rettelbach et al. |
| 2011/0170790 A1* | 7/2011 | Cheon ................ H04N 19/91 382/233 |
| 2011/0173006 A1 | 7/2011 | Nagel et al. |
| 2011/0173007 A1* | 7/2011 | Multrus ............ G10L 19/022 704/500 |
| 2011/0173008 A1 | 7/2011 | Lecomte et al. |
| 2011/0194712 A1 | 8/2011 | Potard |
| 2011/0200196 A1 | 8/2011 | Disch et al. |
| 2011/0202352 A1 | 8/2011 | Neuendorf et al. |
| 2011/0202354 A1 | 8/2011 | Grill et al. |
| 2011/0202358 A1 | 8/2011 | Neuendorf et al. |
| 2011/0235809 A1 | 9/2011 | Schuijers et al. |
| 2011/0238425 A1 | 9/2011 | Neuendorf et al. |
| 2011/0238426 A1* | 9/2011 | Fuchs ................ H04N 19/12 386/346 |
| 2011/0257984 A1 | 10/2011 | Virette et al. |
| 2011/0264454 A1 | 10/2011 | Ullberg et al. |
| 2011/0264457 A1 | 10/2011 | Oshikiri et al. |
| 2011/0288873 A1 | 11/2011 | Nagel et al. |
| 2011/0295598 A1 | 12/2011 | Yang et al. |
| 2011/0295600 A1* | 12/2011 | Sung ................ G10L 19/032 704/219 |
| 2011/0305352 A1 | 12/2011 | Villemoes et al. |
| 2011/0320212 A1 | 12/2011 | Tsujino et al. |
| 2012/0002818 A1 | 1/2012 | Heiko et al. |
| 2012/0010879 A1 | 1/2012 | Tsujino et al. |
| 2012/0029923 A1 | 2/2012 | Rajendran et al. |
| 2012/0029925 A1 | 2/2012 | Duni et al. |
| 2012/0065965 A1 | 3/2012 | Choo et al. |
| 2012/0095756 A1* | 4/2012 | Sung ................ G10L 19/07 704/219 |
| 2012/0095769 A1 | 4/2012 | Zhang et al. |
| 2012/0136670 A1 | 5/2012 | Ishikawa et al. |
| 2012/0158409 A1 | 6/2012 | Nagel et al. |
| 2012/0209600 A1 | 8/2012 | Kim et al. |
| 2012/0226505 A1 | 9/2012 | Lin et al. |
| 2012/0230599 A1* | 9/2012 | Norkin ................ H04N 19/60 382/238 |
| 2012/0245947 A1* | 9/2012 | Neuendorf ........ H04N 19/61 375/E7.106 |
| 2012/0253797 A1 | 10/2012 | Geiger et al. |
| 2012/0265534 A1 | 10/2012 | Coorman et al. |
| 2012/0271644 A1 | 10/2012 | Bessette et al. |
| 2012/0296641 A1 | 11/2012 | Rajendran et al. |
| 2013/0006645 A1 | 1/2013 | Jiang et al. |
| 2013/0035777 A1 | 2/2013 | Niemisto et al. |
| 2013/0051571 A1 | 2/2013 | Nagel et al. |
| 2013/0051574 A1 | 2/2013 | Yoo |
| 2013/0090933 A1 | 4/2013 | Villemoes et al. |
| 2013/0090934 A1 | 4/2013 | Nagel et al. |
| 2013/0117015 A1 | 5/2013 | Bayer et al. |
| 2013/0121411 A1 | 5/2013 | Robillard et al. |
| 2013/0124214 A1 | 5/2013 | Yamamoto et al. |
| 2013/0144632 A1 | 6/2013 | Sung |
| 2013/0156112 A1 | 6/2013 | Suzuki et al. |
| 2013/0182870 A1* | 7/2013 | Villemoes ............ G10L 19/025 381/99 |
| 2013/0185085 A1 | 7/2013 | Tsujino et al. |
| 2013/0226596 A1* | 8/2013 | Geiger ................ H04N 19/60 382/238 |
| 2013/0282383 A1 | 10/2013 | Hedelin et al. |
| 2013/0289981 A1 | 10/2013 | Ragot et al. |
| 2013/0332176 A1 | 12/2013 | Setiawan et al. |
| 2014/0088973 A1 | 3/2014 | Gibbs et al. |
| 2014/0149126 A1 | 5/2014 | Soulodre |
| 2014/0188464 A1 | 7/2014 | Choo |
| 2014/0200901 A1 | 7/2014 | Kawashima et al. |
| 2014/0229186 A1 | 8/2014 | Mehrotra et al. |
| 2014/0329511 A1* | 11/2014 | Vesa ................ H04N 19/91 382/233 |
| 2015/0046172 A1 | 2/2015 | Moriya et al. |
| 2015/0071446 A1 | 3/2015 | Sun et al. |
| 2015/0187366 A1 | 7/2015 | Moriya et al. |
| 2016/0035329 A1 | 2/2016 | Ekstrand et al. |
| 2016/0104490 A1 | 4/2016 | Sukowski et al. |
| 2016/0140980 A1 | 5/2016 | Disch et al. |
| 2016/0210977 A1 | 7/2016 | Ghido et al. |
| 2016/0247506 A1* | 8/2016 | Lecomte ................ G10L 19/022 704/500 |
| 2016/0275955 A1* | 9/2016 | Liu ................ G10L 19/035 |
| 2017/0011746 A1 | 1/2017 | Zhou et al. |
| 2017/0110135 A1 | 4/2017 | Disch et al. |
| 2017/0116999 A1 | 4/2017 | Gao |
| 2017/0133023 A1 | 5/2017 | Disch et al. |
| 2017/0178649 A1 | 6/2017 | Sung |
| 2017/0221492 A1 | 8/2017 | Villemoes |
| 2018/0068646 A1 | 3/2018 | Esparza |
| 2022/0120641 A1* | 4/2022 | Chen ................ G01N 1/06 |
| 2022/0284908 A1* | 9/2022 | Guo ................ G10L 19/0204 |

FOREIGN PATENT DOCUMENTS

| | | | |
|---|---|---|---|
| CN | 1465137 A | 12/2003 | |
| CN | 1467703 A | 1/2004 | |
| CN | 1496559 A | 5/2004 | |
| CN | 1503968 A | 6/2004 | |
| CN | 1647154 A | 7/2005 | |
| CN | 1659927 A | 8/2005 | |
| CN | 1677491 A | 10/2005 | |
| CN | 1677493 A | 10/2005 | |
| CN | 1813286 A | 8/2006 | |
| CN | 1864436 A | 11/2006 | |
| CN | 1905373 A | 1/2007 | |
| CN | 1918631 A | 2/2007 | |
| CN | 1918632 A | 2/2007 | |
| CN | 101006494 A | 7/2007 | |
| CN | 101067931 A | 11/2007 | |
| CN | 101083076 A | 12/2007 | |
| CN | 101185124 A | 5/2008 | |
| CN | 101185127 A | 5/2008 | |
| CN | 101238510 A | 8/2008 | |
| CN | 101325059 A | 12/2008 | |
| CN | 101502122 A | 8/2009 | |
| CN | 101521014 A | 9/2009 | |
| CN | 101552005 A | 10/2009 | |
| CN | 101609680 A | 12/2009 | |
| CN | 101622669 A | 1/2010 | |
| CN | 101689961 A * | 3/2010 | ........ H04L 1/0045 |
| CN | 101335000 B * | 4/2010 | ........ G10L 19/012 |
| CN | 101849258 A | 9/2010 | |
| CN | 101933086 A | 12/2010 | |
| CN | 101939782 A | 1/2011 | |
| CN | 101946526 A | 1/2011 | |
| CN | 102089758 A | 6/2011 | |

(56) References Cited

FOREIGN PATENT DOCUMENTS

| | | | |
|---|---|---|---|
| CN | 102105930 A | 6/2011 | |
| CN | 101223573 B * | 7/2011 | ........ G10L 19/0017 |
| CN | 102227910 A * | 10/2011 | ........ H04N 19/117 |
| CN | 101847413 B * | 11/2011 | ........ H04N 19/117 |
| CN | 102798870 A * | 11/2012 | ........ G10L 19/0017 |
| CN | 103038819 A | 4/2013 | |
| CN | 103038821 A | 4/2013 | |
| CN | 103165136 A | 6/2013 | |
| CN | 103971699 A | 8/2014 | |
| EP | 0751493 | 2/1997 | |
| EP | 1734511 A2 | 12/2006 | |
| EP | 1446797 B1 | 5/2007 | |
| EP | 2077551 | 7/2009 | |
| EP | 2144171 A1 | 1/2010 | |
| EP | 2077551 B1 | 3/2011 | |
| EP | 2830056 A1 | 1/2015 | |
| EP | 2830059 A1 | 1/2015 | |
| EP | 2830063 A1 | 1/2015 | |
| EP | 3021322 A1 * | 5/2016 | ........ G10L 19/038 |
| GB | 2470385 A | 11/2010 | |
| JP | 07336231 A | 12/1995 | |
| JP | 2001053617 A | 2/2001 | |
| JP | 2002050967 A | 2/2002 | |
| JP | 2002268693 A | 9/2002 | |
| JP | 2003108197 A | 4/2003 | |
| JP | 2003140692 A | 5/2003 | |
| JP | 2004046179 A | 2/2004 | |
| JP | 2006293400 A | 10/2006 | |
| JP | 2006323037 A | 11/2006 | |
| JP | 3898218 B2 | 3/2007 | |
| JP | 3943127 B2 | 7/2007 | |
| JP | 2007532934 A | 11/2007 | |
| JP | 2009501358 A | 1/2009 | |
| JP | 2010526346 A | 7/2010 | |
| JP | 2010538318 A | 12/2010 | |
| JP | 2011154384 A | 8/2011 | |
| JP | 2011527447 A | 10/2011 | |
| JP | 2012027498 A | 2/2012 | |
| JP | 2012037582 A | 2/2012 | |
| JP | 2013125187 A | 6/2013 | |
| JP | 2013521538 A | 6/2013 | |
| JP | 2013524281 A | 6/2013 | |
| JP | 2013552851 A | 8/2013 | |
| JP | 6031198 B2 | 10/2016 | |
| JP | 6666356 B2 | 2/2020 | |
| JP | 7078592 B2 | 5/2022 | |
| KR | 100406674 B1 * | 1/2004 | ........ H04L 1/0045 |
| KR | 1020070118173 A | 12/2007 | |
| KR | 20130025963 A | 3/2013 | |
| RU | 2323469 C2 | 4/2008 | |
| RU | 2325708 C2 | 5/2008 | |
| RU | 2388068 C2 | 4/2010 | |
| RU | 2422922 C1 | 6/2011 | |
| RU | 2428747 C2 | 9/2011 | |
| RU | 2455709 C2 | 7/2012 | |
| RU | 2459282 C2 | 8/2012 | |
| RU | 2470385 C2 | 12/2012 | |
| RU | 2477532 C2 | 3/2013 | |
| RU | 2481650 C2 | 5/2013 | |
| RU | 2482554 C1 | 5/2013 | |
| RU | 2487427 C2 | 7/2013 | |
| TW | 412719 B | 11/2000 | |
| TW | 200537436 | 11/2005 | |
| TW | 200638336 A | 11/2006 | |
| TW | 200912897 A | 3/2009 | |
| TW | 200939206 A | 9/2009 | |
| TW | 201007696 A | 2/2010 | |
| TW | 201009812 A | 3/2010 | |
| TW | 201034001 A | 9/2010 | |
| TW | 201205558 A | 2/2012 | |
| TW | 201243833 A | 11/2012 | |
| TW | 201316327 A | 4/2013 | |
| TW | 201333933 A | 8/2013 | |
| TW | 201506908 A | 2/2015 | |
| WO | 9602050 A1 | 1/1996 | |
| WO | WO-0122402 A1 * | 3/2001 | ........ G10L 19/00 |
| WO | 2005104094 A1 | 11/2005 | |
| WO | 2005109240 A1 | 11/2005 | |
| WO | 2006049204 A1 | 5/2006 | |
| WO | 2006107840 A1 | 10/2006 | |
| WO | 2006113921 A1 | 10/2006 | |
| WO | 2008084427 | 7/2008 | |
| WO | 2009121298 A1 | 10/2009 | |
| WO | 2010070770 A1 | 6/2010 | |
| WO | 2010114123 A1 | 10/2010 | |
| WO | 2010136459 A1 | 12/2010 | |
| WO | 2011047887 A1 | 4/2011 | |
| WO | 2011110499 A1 | 9/2011 | |
| WO | 2012012414 A1 | 1/2012 | |
| WO | 2012110482 A2 | 8/2012 | |
| WO | 2013035257 A1 | 3/2013 | |
| WO | 2013061530 A1 | 5/2013 | |
| WO | 2013/147666 A1 | 10/2013 | |
| WO | 2013/147668 A1 | 10/2013 | |
| WO | 2014108393 A1 | 7/2014 | |
| WO | 2014161996 A2 | 10/2014 | |
| WO | 2015010949 A1 | 1/2015 | |

OTHER PUBLICATIONS

Zhe, Ji "Research on Low-Rate Speech Coding Algorithms", CNKI China Doctoral Dissertation, 2012.

"Information technology—MPEG audio technologies—Part 3: Unified speech and audio coding", ISO/IEC FDIS 23003-3:2011(E); ISO/IEC JTC 1/SC 29/WG 11; STD Version 2.1c2, 2011, 286 pps.

3GPP TS 26.443, , "3rd Generation Partnership Project; Technical Specification Group Services and System Aspects; Codec for Enhanced Voice Services (EVS); ANSI C code (floating-point) (Release 12)", 3GPP TS 26.443, "Codec for Enhanced Voice Services (EVS)," Release 12, Dec. 2014., Dec. 2014, 1-9.

Annadana, Raghuram et al., "New Results in Low Bit Rate Speech Coding and Bandwidth Extension", Audio Engineering Society Convention 121, Audio Engineering Society Convention Paper 6876, Oct. 5, 2006, pp. 1-6.

Bosi, Marina et al., "ISO/IEC MPEG-2 Advanced Audio Coding", J. Audio Eng. Soc., vol. 45, No. 10, Oct. 1997, pp. 789-814.

Daudet, Laurent et al., "MDCT analysis of sinusoids: exact results and applications to coding artifacts reduction", IEEE Transactions on Speech and Audio Processing, IEEE, vol. 12, No. 3, May 2004, pp. 302-312.

Den Brinker, A. C. et al., "An overview of the coding standard MPEG-4 audio amendments 1 and 2: HE-AAC, SSC, and HE-AAC v2", EURASIP Journal on Audio, Speech, and Music Processing, 2009, Feb. 24, 2009, 24 pps.

Dietz, Martin et al., "Spectral Band Replication, a Novel Approach in Audio Coding", Engineering Society Convention 121, Audio Engineering Society Paper 5553, May 10, 2002, pp. 1-8.

Ekstrand, Per , "Bandwidth Extension of Audio Signals by Spectral Band Replication", Proc.1st IEEE Benelux Workshop on Model based Processing and Coding of Audio (MPCA-2002), Nov. 15, 2002, pp. 53-58.

Ferreira, Anibal J. et al., "Accurate Spectral Replacement", Audio Engineering Society Convention, 118, Audio Engineering Society Convention Paper No. 6383, May 28, 2005, pp. 1-11.

Geiser, Bernd et al., "Bandwidth Extension for Hierarchical Speech and Audio Coding in ITU-T Rec. G.729.1", IEEE Transactions on Audio, Speech and Language Processing, IEEE Service Center, vol. 15, No. 8, Nov. 2007, pp. 2496-2509.

Herre, Jurgen et al., "Extending the MPEG-4 AAC Codec by Perceptual Noise Substitution", Audio Engineering Society Convention 104, Audio Engineering Society Preprint,, May 16, 1998, pp. 1-14.

Herre, Jurgen , "Temporal Noise Shaping, Quantization and Coding Methods in Perceptual Auidio Coding: A Tutorial Introduction", Audio Engineering Society Conference: 17th International Conference: High-Quality Audio Coding, Audio Engineering Society, Aug. 1, 1999, pp. 312-325.

(56) References Cited

OTHER PUBLICATIONS

Herre, Jürgen et al., "Extending the MPEG-4 AAC Codec by Perceptual Noise Substitution", 104th AES Convention, Amsterdam, 1998, Preprint 4720, 1998,.

ISO/IEC 13818-3:1998(E), , "Information Technology—Generic Coding of Moving Pictures and Associated Audio, Part 3: Audio", Second Edition, ISO/IEC, Apr. 15, 1998, 132 pps.

ISO/IEC 13818-7, , "Information technology—Generic coding of moving pictures and associated audio information—Part 7: Advanced Audio Coding (AAC)", ISO/IEC 13818-7, Information technology—Part 7: Advanced Audio Coding (AAC), 2006, Version attached by inventor is 2005. 2006 publication not available online and would have to be bought. Inventor says 2005 publication is a pre-version. Let us know whether this version is acceptable., 2005, 1-202.

ISO/IEC 14496-3:2001, , "Information Technology—Coding of audio-visual objects—Part 3: Audio, AMENDMENT 1: Bandwidth Extension", ISO/IEC JTC1/SC29/WG11/N5570, ISO/IEC 14496-3:2001/FDAM 1:2003(E), Mar. 2003, 127 pps.

ISO/IEC 23008-3:2015(E), , "Information Technology—High Efficiency Coding and Media Delivery in Heterogeneous Environments—Part 3: 3D audio", Feb. 20, 2015, 438 pages.

ISO/IEC FDIS 23003-3:2011(E), , "Information Technology—MPEG audio technologies—Part 3: Unified speech and audio coding, Final Draft", ISO/IEC, 2010, 286 pps.

Mcaulay, Robert J. et al., "Speech Analysis/ Synthesis Based on a Sinusoidal Representation", IEEE Transactions on Acoustics, Speech and Signal Processing, vol. ASSP-34, No. 4, Aug. 1986, pp. 744-754.

Mehrotra, Sanjeev et al., "Hybrid low bitrate audio coding using adaptive gain shape vector quantization", Multimedia Signal Processing, 2008 IEEE 10th Workshop On, IEEE, Piscataway, NJ, USA XP031356759 ISBN: 978-1-4344-3394-4, Oct. 8, 2008, pp. 927-932.

Nagel, Frederik et al., "A Continuous Modulated Single Sideband Bandwidth Extension", ICASSP International Conference on Acoustics, Speech and Signal Processing, Apr. 2010, pp. 357-360.

Nagel, Frederik et al., "A Harmonic Bandwidth Extension Method for Audio Codecs", International Conference on Acoustics, Speech and Signal Processing, XP002527507, Apr. 19, 2009, pp. 145-148.

Nagel, Frederik et al., "A Harmonic Banwidth Extension Method for Audio Codecs", International Conference on Acoustics, Speech and Signal Processing 2009, Taipei, Apr. 19, 2009, pp. 145-148.

Neuendorf, Max et al., "MPEG Unified Speech and Audio Coding—The ISO/MPEG Standard for High-Efficiency Audio Coding of all Content Types", Audio Engineering Society Convention Paper 8654, Presented at the 132nd Convention, Apr. 26, 2012, pp. 1-22.

Purnhagen, Heiko et al., "HILN-the MPEG-4 parametric audio coding tools", Proceedings ISCAS 2000 Geneva, The 2000 IEEE International Symposium on Circuits and Systems, 2000, pp. 201-204.

Sinha, Deepen et al., "A Novel Integrated Audio Bandwidth Extension Toolkit", ABET, Audio Engineering Society Convention, Paris, France, 2006, 1-12.

Smith, Julius O. et al., "PARSHL: An analysis/synthesis program for non-harmonic sounds based on a sinusoidal representation", Proceedings of the International Computer Music Conference, 1987, 1-22.

Valin, JM et al., "Defintion of the Opus Audio Codec", IETF, Sep. 2012, pp. 1-326.

Zernicki, Tomasz et al., "Audio bandwidth extension by frequency scaling of sinusoidal partials", Audio Engineering Society Convention, San Francisco, USA, 2008, 1-7.

EVS Codec Detailed Algorithmic Description (3GPP TS 26.445 version 12.0.0 Release 12). ETSI TS 126 445 V12.0.0.2014.11., 2014.

"Information technology—Generic coding of moving pictures and associated audio information—Part 7: Advanced Audio Coding (AAC)", International Standard ISO/IEC13818-7 Fourth edition,", International Standard ISO/IEC13818-7 Fourth edition", Jan. 15, 2006, pp. 172-174.

Motlicek, Petr , et al., "Wide-Band Perceptual Audio Coding Based On Frequency-Domain Linear Prediction".

* cited by examiner

300

```
┌─────────────────────────────────────────────────────────────┐
│ Determining spectral coefficients of the audio signal for a │
│ current frame and at least one previous frame; and          │──302
└─────────────────────────────────────────────────────────────┘
                              │
                              ▼
┌─────────────────────────────────────────────────────────────┐
│ selectively applying predictive encoding to a plurality of  │
│ individual spectral coefficients or groups of spectral      │──304
│ coefficients which are separated by at least one spectral   │
│ coefficient.                                                │
└─────────────────────────────────────────────────────────────┘
```

```
┌─────────────────────────────────────────────────────────────┐
│ Parsing the encoded audio signal to obtain encoded spectral │
│ coefficients of the audio signal for a current frame and at │──402
│ least one previous frame; and                               │
└─────────────────────────────────────────────────────────────┘
                              │
                              ▼
┌─────────────────────────────────────────────────────────────┐
│ selectively applying predictive decoding to a plurality of  │
│ individual encoded spectral coefficients or groups of       │
│ encoded spectral coefficients which are separated by at     │──404
│ least one encoded spectral coefficient.                     │
└─────────────────────────────────────────────────────────────┘
```

FIG 6

AUDIO ENCODER, AUDIO DECODER, METHOD FOR ENCODING AN AUDIO SIGNAL AND METHOD FOR DECODING AN ENCODED AUDIO SIGNAL

CROSS-REFERENCE TO RELATED APPLICATIONS

This application is a continuation of copending U.S. patent application Ser. No. 15/697,042, filed on Sep. 6, 2017, which in turn is a continuation of copending International Application No. PCT/EP2016/054831, filed Mar. 7, 2016, which is incorporated herein by reference in its entirety, and additionally claims priority from European Application No. EP 15158253.3, filed Mar. 9, 2015, and WO Application No. PCT/EP2015/063658, filed Jun. 17, 2015, all of which are incorporated herein by reference in their entirety.

Embodiments relate to audio coding, in particular, to a method and apparatus for encoding an audio signal using predictive encoding and to a method and apparatus for decoding an encoded audio signal using predictive decoding. Advantageous embodiments relate to methods and apparatuses for pitch-adaptive spectral prediction. Further advantageous embodiments relate to perceptual coding of tonal audio signals by means of transform coding with spectral-domain inter-frame prediction tools.

BACKGROUND OF THE INVENTION

To improve the quality of coded tonal signals especially at low bit-rates, modern audio transform coders employ very long transforms and/or long-term prediction or pre-/post-filtering. A long transform, however, implies a long algorithmic delay, which is undesirable for low-delay communication scenarios. Hence, predictors with very low delay based on the instantaneous fundamental pitch have gained popularity recently. The IETF (Internet Engineering Task Force) Opus codec utilizes pitch-adaptive pre- and postfiltering in its frequency-domain CELT (Constrained-Energy Lapped Transform) coding path [J. M. Valin, K. Vos, and T. Terriberry, "Definition of the Opus audio codec," 2012, IETF RFC 6716. http://tools.ietf.org/html/rfc67161.], and the 3GPP (3rd Generation Partnership Project) EVS (Enhanced Voice Services) codec provides a long-term harmonic post-filter for perceptual improvement of transform-decoded signals [3GPP TS 26.443, "Codec for Enhanced Voice Services (EVS)," Release 12, December 2014.]. Both of these approaches operate in the time domain on the fully decoded signal waveform, making it difficult and/or computationally expensive to apply them frequency-selectively (both schemes only offer a simple low-pass filter for some frequency selectivity). A welcome alternative to time-domain long-term prediction (LTP) or pre-/post-filtering (PPF) is thus provided by frequency-domain prediction (FDP) like it is supported in MPEG-2 AAC [ISO/IEC 13818-7, "Information technology—Part 7: Advanced Audio Coding (AAC)," 2006.]. This method, although facilitating frequency selectivity, has its own disadvantages, as described hereafter.

The FDP method introduced above has two drawbacks over the other tools. First, the FDP method involves high computational complexity. In detail, linear predictive coding of at least order two (i.e. from the last two frame's channel transform bins) is applied onto hundreds of spectral bins for each frame and channel in the worst case of prediction in all scale factor bands [ISO/IEC 13818-7, "Information technology—Part 7: Advanced Audio Coding (AAC)," 2006.]. Second, the FDP method comprises a limited overall prediction gain. More precisely, the efficiency of the prediction is limited because noisy components between predictable harmonic, tonal spectral parts are subjected to the prediction as well, introducing errors as these noisy parts are typically not predictable.

The high complexity is due to the backward adaptivity of the predictors. This means that the prediction coefficients for each bin have to be calculated based on previously transmitted bins. Therefore, numerical inaccuracies between encoder and decoder can lead to reconstruction errors due to diverging prediction coefficients. To overcome this problem, bit exact identical adaptation has to be guaranteed. Furthermore, even if groups of predictors are disabled in certain frames, the adaptation has to be performed in order to keep the prediction coefficients up to date.

SUMMARY

According to an embodiment, an encoder for encoding an audio signal may be configured to encode the audio signal in a transform domain or filter-bank domain, wherein the encoder is configured to determine spectral coefficients of the audio signal for a current frame and at least one previous frame, wherein the encoder is configured to selectively apply predictive encoding to a plurality of individual spectral coefficients or groups of spectral coefficients, wherein the encoder is configured to determine a spacing value, wherein the encoder is configured to select the plurality of individual spectral coefficients or groups of spectral coefficients to which predictive encoding is applied based on the spacing value.

According to another embodiment, a decoder for decoding an encoded audio signal may be configured to decode the encoded audio signal in a transform domain or filter-bank domain, wherein the decoder is configured to parse the encoded audio signal to acquire encoded spectral coefficients of the audio signal for a current frame and at least one previous frame, and wherein the decoder is configured to selectively apply predictive decoding to a plurality of individual encoded spectral coefficients or groups of encoded spectral coefficients, wherein the decoder is configured to acquire a spacing value, wherein the decoder is configured to select the plurality of individual encoded spectral coefficients or groups of encoded spectral coefficients to which predictive decoding is applied based on the spacing value.

According to another embodiment, a method for encoding an audio signal in a transform domain or filter-bank domain may have the following steps: determining spectral coefficients of the audio signal for a current frame and at least one previous frame; determining a spacing value; and selectively applying predictive encoding to a plurality of individual spectral coefficients or groups of spectral coefficients, wherein the plurality of individual spectral coefficients or groups of spectral coefficients to which predictive encoding is applied are selected based on the spacing value.

According to another embodiment, a method for decoding an encoded audio signal in a transform domain or filter-bank domain may have the following steps: parsing the encoded audio signal to acquire encoded spectral coefficients of the audio signal for a current frame and at least one previous frame; acquiring a spacing value; and selectively applying predictive decoding to a plurality of individual encoded spectral coefficients or groups of encoded spectral coefficients, wherein the plurality of individual encoded spectral coefficients or groups of encoded spectral coefficients to which predictive decoding is applied are selected based on the spacing value.

According to another embodiment, a non-transitory digital storage medium having a computer program stored thereon to perform the method for encoding an audio signal in a transform domain or filter-bank domain, the method having the following steps: determining spectral coefficients of the audio signal for a current frame and at least one previous frame; determining a spacing value; and selectively applying predictive encoding to a plurality of individual spectral coefficients or groups of spectral coefficients, wherein the plurality of individual spectral coefficients or groups of spectral coefficients to which predictive encoding is applied are selected based on the spacing value, when said computer program is run by a computer.

According to another embodiment, a non-transitory digital storage medium having a computer program stored thereon to perform the method for decoding an encoded audio signal in a transform domain or filter-bank domain, the method having the following steps: parsing the encoded audio signal to acquire encoded spectral coefficients of the audio signal for a current frame and at least one previous frame; acquiring a spacing value; and selectively applying predictive decoding to a plurality of individual encoded spectral coefficients or groups of encoded spectral coefficients, wherein the plurality of individual encoded spectral coefficients or groups of encoded spectral coefficients to which predictive decoding is applied are selected based on the spacing value, when said computer program is run by a computer.

According to another embodiment, an encoder for encoding an audio signal may be configured to encode the audio signal in a transform domain or filter-bank domain, wherein the encoder is configured to determine spectral coefficients of the audio signal for a current frame and at least one previous frame, wherein the encoder is configured to selectively apply predictive encoding to a plurality of individual spectral coefficients or groups of spectral coefficients, wherein the encoder is configured to determine a spacing value, wherein the encoder is configured to select the plurality of individual spectral coefficients or groups of spectral coefficients to which predictive encoding is applied based on the spacing value; wherein the encoder is configured to select individual spectral coefficients or groups of spectral coefficients spectrally arranged according to a harmonic grid defined by the spacing value for a predictive encoding.

According to another embodiment, a decoder for decoding an encoded audio signal may be configured to decode the encoded audio signal in a transform domain or filter-bank domain, wherein the decoder is configured to parse the encoded audio signal to acquire encoded spectral coefficients of the audio signal for a current frame and at least one previous frame, and wherein the decoder is configured to selectively apply predictive decoding to a plurality of individual encoded spectral coefficients or groups of encoded spectral coefficients, wherein the decoder is configured to acquire a spacing value, wherein the decoder is configured to select the plurality of individual encoded spectral coefficients or groups of encoded spectral coefficients to which predictive decoding is applied based on the spacing value; wherein the decoder is configured to select individual spectral coefficients or groups of spectral coefficients spectrally arranged according to a harmonic grid defined by the spacing value for a predictive decoding.

Embodiments provide an encoder for encoding an audio signal. The encoder is configured to encode the audio signal in a transform domain or filter-bank domain, wherein the encoder is configured to determine spectral coefficients of the audio signal for a current frame and at least one previous frame, wherein the encoder is configured to selectively apply predictive encoding to a plurality of individual spectral coefficients or groups of spectral coefficients, wherein the encoder is configured to determine a spacing value, wherein the encoder is configured to select the plurality of individual spectral coefficients or groups of spectral coefficients to which predictive encoding is applied based on the spacing value which may be transmitted as side information with the encoded audio signal.

Further embodiments provide a decoder for decoding an encoded audio signal (e.g., encoded with the above described encoder). The decoder is configured to decode the encoded audio signal in a transform domain or filter-bank domain, wherein the decoder is configured to parse the encoded audio signal to obtain encoded spectral coefficients of the audio signal for a current frame and at least one previous frame, and wherein the decoder is configured to selectively apply predictive decoding to a plurality of individual encoded spectral coefficients or groups of encoded spectral coefficients, wherein the decoder may be configured to select the plurality of individual encoded spectral coefficients or groups of encoded spectral coefficients to which predictive decoding is applied based on a transmitted spacing value.

According to the concept of the present invention, predictive encoding is (only) applied to selected spectral coefficients. The spectral coefficients to which predictive encoding is applied can be selected in dependence on signal characteristics. For example, by not applying predictive encoding to noisy signal components the aforementioned errors introduced by predicting non-predictable noisy signal components are avoided. At the same time computational complexity can be reduced since predictive encoding is only applied to selected spectral components.

For example, perceptual coding of tonal audio signals can be performed (e.g., by the encoder) by means of transform coding with guided/adaptive spectral-domain inter-frame prediction methods. The efficiency of frequency domain prediction (FDP) can be increased, and the computational complexity can be reduced, by applying the prediction only to spectral coefficients, for example, around harmonic signal components located at integer multiples of a fundamental frequency or pitch, which can be signaled in an appropriate bit-stream from an encoder to a decoder, e.g. as a spacing value. Embodiments of the present invention can be advantageously implemented or integrated into the MPEG-H 3D audio codec, but are applicable to any audio transform coding system, such as, e.g., MPEG-2 AAC.

Further embodiments provide a method for encoding an audio signal in a transform domain or filter-bank domain, the method comprises:
  determining spectral coefficients of the audio signal for a current frame and at least one previous frame;
  determining a spacing value; and
  selectively applying predictive encoding to a plurality of individual spectral coefficients or groups of spectral coefficients, wherein the plurality of individual spectral coefficients or groups of spectral coefficients to which predictive encoding is applied are selected based on the spacing value.

Further embodiments provide a method for decoding an encoded audio signal in a transform domain or filter-bank domain, the method comprises:

parsing the encoded audio signal to obtain encoded spectral coefficients of the audio signal for a current frame and at least one previous frame;

obtaining a spacing value; and selectively applying predictive decoding to a plurality of individual encoded spectral coefficients or groups of encoded spectral coefficients, wherein the plurality of individual encoded spectral coefficients or groups of encoded spectral coefficients to which predictive decoding is applied are selected based on the spacing value.

BRIEF DESCRIPTION OF THE DRAWINGS

Embodiments of the present invention will be detailed subsequently referring to the appended drawings, in which:

FIG. 5 shows a flowchart of a method for encoding an audio signal, according to an embodiment; and FIG. 6 shows a flowchart of a method for decoding an encoded audio signal, according to an embodiment.

DETAILED DESCRIPTION OF THE INVENTION

Figure 1:
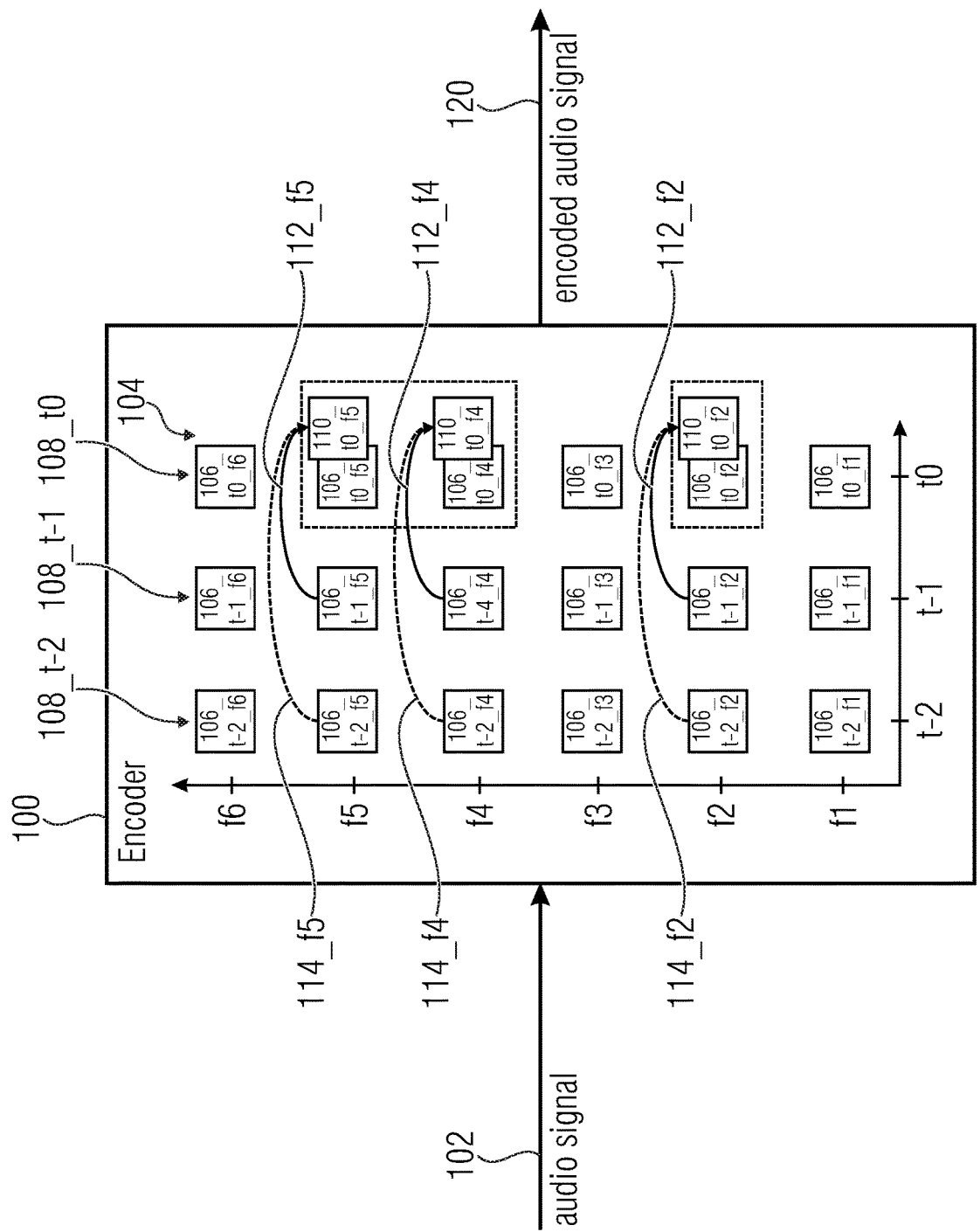
FIG. 1 shows a schematic block diagram of an encoder for encoding an audio signal, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other unless specifically noted otherwise.

FIG. 1 shows a schematic block diagram of an encoder 100 for encoding an audio signal 102, according to an embodiment. The encoder 100 is configured to encode the audio signal 102 in a transform domain or filter-bank domain 104 (e.g., frequency domain, or spectral domain), wherein the encoder 100 is configured to determine spectral coefficients $106\_t0\_f1$ to $106\_t0\_f6$ of the audio signal 102 for a current frame $108\_t0$ and spectral coefficients $106\_t-1\_f1$ to $106\_t-1\_f6$ of the audio signal for at least one previous frame $108\_t-1$. Further, the encoder 100 is configured to selectively apply predictive encoding to a plurality of individual spectral coefficients $106\_t0\_f2$ or groups of spectral coefficients $106\_t0\_f4$ and $106\_t0\_f5$, wherein the encoder 100 is configured to determine a spacing value, wherein the encoder 100 is configured to select the plurality of individual spectral coefficients $106\_t0\_f2$ or groups of spectral coefficients $106\_t0\_f4$ and $106\_t0\_f5$ to which predictive encoding is applied based on the spacing value.

In other words, the encoder 100 is configured to selectively apply predictive encoding to a plurality of individual spectral coefficients $106\_t0\_f2$ or groups of spectral coefficients $106\_t0\_f4$ and $106\_t0\_f5$ selected based on a single spacing value transmitted as side information.

This spacing value may correspond to a frequency (e.g. a fundamental frequency of a harmonic tone (of the audio signal 102)), which defines together with its integer multiples the centers of all groups of spectral coefficients for which prediction is applied: The first group can be centered around this frequency, the second group can be centered around this frequency multiplied by two, the third group can be centered around this frequency multiplied by three, and so on. The knowledge of these center frequencies enables the calculation of prediction coefficients for predicting corresponding sinusoidal signal components (e.g. fundamental and overtones of harmonic signals). Thus, complicated and error prone backward adaptation of prediction coefficients is no longer needed.

In embodiments, the encoder 100 can be configured to determine one spacing value per frame.

In embodiments, the plurality of individual spectral coefficients $106\_t0\_f2$ or groups of spectral coefficients $106\_t0\_f4$ and $106\_t0\_f5$ can be separated by at least one spectral coefficient $106\_t0\_f3$.

In embodiments, the encoder 100 can be configured to apply the predictive encoding to a plurality of individual spectral coefficients which are separated by at least one spectral coefficient, such as to two individual spectral coefficients which are separated by at least one spectral coefficient. Further, the encoder 100 can be configured to apply the predictive encoding to a plurality of groups of spectral coefficients (each of the groups comprising at least two spectral coefficients) which are separated by at least one spectral coefficient, such as to two groups of spectral coefficients which are separated by at least one spectral coefficient. Further, the encoder 100 can be configured to apply the predictive encoding to a plurality of individual spectral coefficients and/or groups of spectral coefficients which are separated by at least one spectral coefficient, such as to at least one individual spectral coefficient and at least one group of spectral coefficients which are separated by at least one spectral coefficient.

In the example shown in FIG. 1, the encoder 100 is configured to determine six spectral coefficients $106\_t0\_f1$ to $106\_t0\_f6$ for the current frame $108\_t0$ and six spectral coefficients $106\_t-1\_f1$ to $106\_t-1\_f6$ for the previous frame $108\_t-1$. Thereby, the encoder 100 is configured to selectively apply predictive encoding to the individual second spectral coefficient $106\_t0\_f2$ of the current frame and to the group of spectral coefficients consisting of the fourth and fifth spectral coefficients $106\_t0\_f4$ and $106\_t0\_f5$ of the current frame $108\_t0$. As can be seen, the individual second spectral coefficient $106\_t0\_f2$ and the group of spectral coefficients consisting of the fourth and fifth spectral coefficients $106\_t0\_f4$ and $106\_t0\_f5$ are separated from each other by the third spectral coefficient $106\_t0\_f3$.

Note that the term "selectively" as used herein refers to applying predictive encoding (only) to selected spectral coefficients. In other words, predictive encoding is not necessarily applied to all spectral coefficients, but rather only to selected individual spectral coefficients or groups of spectral coefficients, the selected individual spectral coefficients and/or groups of spectral coefficients which can be separated from each other by at least one spectral coefficient. In other words, predictive encoding can be disabled for at least one spectral coefficient by which the selected plurality of individual spectral coefficients or groups of spectral coefficients are separated.

In embodiments, the encoder 100 can be configured to selectively apply predictive encoding to a plurality of individual spectral coefficients **106_*t*0_*f*2 or groups of spectral coefficients 106_*t*0_*f*4 and 106_*t*0_*f*5 of the current frame 108_*t*0 based on at least a corresponding plurality of individual spectral coefficients 106_*t*-1_*f*2 or groups of spectral coefficients 106_*t*-1_*f*4 and 106_*t*-1_*f*5 of the previous frame 108_*t*-1**.

For example, the encoder 100 can be configured to predictively encode the plurality of individual spectral coefficients **106_*t*0_*f*2 or the groups of spectral coefficients 106_*t*0_*f*4 and 106_*t*0_*f*5 of the current frame 108_*t*0, by coding prediction errors between a plurality of predicted individual spectral coefficients 110_*t*0_*f*2 or groups of predicted spectral coefficients 110_*t*0_*f*4 and 110_*t*0_*f*5 of the current frame 108_*t*0 and the plurality of individual spectral coefficients 106_*t*0_*f*2 or groups of spectral coefficients 106_*t*0_*f*4 and 106_*t*0_*f*5** of the current frame (or quantized versions thereof).

In FIG. 1, the encoder 100 encodes the individual spectral coefficient **106_*t*0_*f*2 and the group of spectral coefficients consisting of the spectral coefficients 106_*t*0_*f*4 and 106_*t*0_*f*5, by coding a prediction errors between the predicted individual spectral coefficient 110_*t*0_*f*2 of the current frame 108_*t*0 and the individual spectral coefficient 106_*t*0_*f*2 of the current frame 108_*t*0 and between the group of predicted spectral coefficients 110_*t*0_*f*4 and 110_*t*0_*f*5 of the current frame and the group of spectral coefficients 106_*t*0_*f*4 and 106_*t*0_*f*5** of the current frame.

In other words, the second spectral coefficient **106_*t*0_*f*2 is coded by coding the prediction error (or difference) between the predicted second spectral coefficient 110_*t*0_*f*2 and the (actual or determined) second spectral coefficient 106_*t*0_*f*2, wherein the fourth spectral coefficient 106_*t*0_*f*4 is coded by coding the prediction error (or difference) between the predicted fourth spectral coefficient 110_*t*0_*f*4 and the (actual or determined) fourth spectral coefficient 106_*t*0_*f*4, and wherein the fifth spectral coefficient 106_*t*0_*f*5 is coded by coding the prediction error (or difference) between the predicted fifth spectral coefficient 110_*t*0_*f*5 and the (actual or determined) fifth spectral coefficient 106_*t*0_*f*5**.

In an embodiment, the encoder 100 can be configured to determine the plurality of predicted individual spectral coefficients **110_*t*0_*f*2 or groups of predicted spectral coefficients 110_*t*0_*f*4 and 110_*t*0_*f*5 for the current frame 108_*t*0 by means of corresponding actual versions of the plurality of individual spectral coefficients 106_*t*-1_*f*2 or of the groups of spectral coefficients 106_*t*-1_*f*4 and 106_*t*-1_*f*5 of the previous frame 108_*t*-1**.

In other words, the encoder 100 may, in the above-described determination process, use directly the plurality of actual individual spectral coefficients **106_*t*-1_*f*2 or the groups of actual spectral coefficients 106_*t*-1_*f*4 and 106_*t*-1_*f*5 of the previous frame 108_*t*-1, where the 106_*t*-1_*f*2, 106_*t*-1_*f*4 and 106_*t*-1_*f*5 represent the original, not yet quantized spectral coefficients or groups of spectral coefficients, respectively, as they are obtained by the encoder 100 such that said encoder may operate in the transform domain or filter-bank domain 104**.

For example, the encoder 100 can be configured to determine the second predicted spectral coefficient **110_*t*0_*f*2 of the current frame 108_*t*0 based on a corresponding not yet quantized version of the second spectral coefficient 106_*t*-1_*f*2 of the previous frame 10 108_*t*-1, the predicted fourth spectral coefficient 110_*t*0_*f*4 of the current frame 108_*t*0 based on a corresponding not yet quantized version of the fourth spectral coefficient 106_*t*-1_*f*4 of the previous frame 108_*t*-1, and the predicted fifth spectral coefficient 110_*t*0_*f*5 of the current frame 108_*t*0 based on a corresponding not yet quantized version of the fifth spectral coefficient 106_*t*-1_*f*5** of the previous frame.

By way of this approach, the predictive encoding and decoding scheme can exhibit a kind of harmonic shaping of the quantization noise, since a corresponding decoder, an embodiment of which is described later with respect to FIG. 4, can only employ, in the above-noted determination step, the transmitted quantized versions of the plurality of individual spectral coefficients **106_*t*-1_*f*2 or of the plurality of groups of spectral coefficients 106_*t*-1_*f*4 and 106_*t*-1_*f*5 of the previous frame 108_*t*-1**, for a predictive decoding.

While such harmonic noise shaping, as it is, for example, traditionally performed by long-term prediction (LTP) in the time domain, can be subjectively advantageous for predictive coding, in some cases it may be undesirable since it may lead to an unwanted, excessive amount of tonality introduced into a decoded audio signal. For this reason, an alternative predictive encoding scheme, which is fully synchronized with the corresponding decoding and, as such, only exploits any possible prediction gains but does not lead to quantization noise shaping, is described hereafter. According to this alternative encoding embodiment, the encoder 100 can be configured to determine the plurality of predicted individual spectral coefficients **110_*t*0_*f*2 or groups of predicted spectral coefficients 110_*t*0_*f*4 and 110_*t*0_*f*5 for the current frame 108_*t*0 using corresponding quantized versions of the plurality of individual spectral coefficients 106_*t*-1_*f*2 or the groups of spectral coefficients 106_*t*-1_*f*4 and 106_*t*-1_*f*5 of the previous frame 108_*t*-1**.

For example, the encoder 100 can be configured to determine the second predicted spectral coefficient **110_*t*0_*f*2 of the current frame 108_*t*0 based on a corresponding quantized version of the second spectral coefficient 106_*t*-1_*f*2 of the previous frame 108_*t*-1, the predicted fourth spectral coefficient 110_*t*0_*f*4 of the current frame 108_*t*0 based on a corresponding quantized version of the fourth spectral coefficient 106_*t*-1_*f*4 of the previous frame 108_*t*-1, and the predicted fifth spectral coefficient 110_*t*0_*f*5 of the current frame 108_*t*0 based on a corresponding quantized version of the fifth spectral coefficient 106_*t*-1_*f*5** of the previous frame.

Further, the encoder 100 can be configured to derive prediction coefficients **112_*f*2, 114_*f*2, 112_*f*4, 114_*f*4, 112_*f*5 and 114_*f*5 from the spacing value, and to calculate the plurality of predicted individual spectral coefficients 110_*t*0_*f*2 or groups of predicted spectral coefficients 110_*t*0_*f*4 and 110_*t*0_*f*5 for the current frame 108_*t*0 using corresponding quantized versions of the plurality of individual spectral coefficients 106_*t*-1_*f*2 and 106_*t*-2_*f*2 or groups of spectral coefficients 106_*t*-1_*f*4, 106_*t*-2_*f*4, 106_*t*-1_*f*5, and 106_*t*-2_*f*5 of at least two previous frames 108_*t*-1 and 108_*t*-2 and using the derived prediction coefficients 112_*f*2, 114_*f*2, 112_*f*4, 114_*f*4, 112_*f*5 and 114_*f*5**.

For example, the encoder 100 can be configured to derive prediction coefficients **112_*f*2 and 114_*f*2 for the second spectral coefficient 106_*t*0_*f*2 from the spacing value, to derive prediction coefficients 112_*f*4 and 114_*f*4** for the fourth spectral coefficient 106_t0_f4 from the spacing value, and to derive prediction coefficients 112_f5 and 114_f5 for the fifth spectral coefficient 106_t0_f5 from the spacing value.

For example, the derivation of prediction coefficients can be derived the following way: If the spacing value corresponds to a frequency f0 or a coded version thereof, the center frequency of the K-th group of spectral coefficients for which prediction is enabled is fc=K*f0. If the sampling frequency is fs and the transform hop size (shift between successive frames) is N, the ideal predictor coefficients in the K-th group assuming a sinusoidal signal with frequency fc are:

$$p1=2*\cos(N*2*pr*fc/fs) \text{ and } p2=-1.$$

If, for example, both spectral coefficients 106_t0_f4 and 106_t0_f5 are within this group, the prediction coefficients are:

$$112\_f4=112\_f5=2*\cos(N*2*pi*fc/fs) \text{ and}$$
$$114\_f4=114\_f5=-1.$$

For stability reasons, a damping factor d can be introduced leading to modified prediction coefficients:

$$112\_f4'=112\_f5'=d*2*\cos(N*2*pi*fc/fs),$$
$$114\_f4'=114\_f5'=d^2.$$

Since the spacing value is transmitted in the coded audio signal 120, the decoder can derive exactly the same prediction coefficients 212_f4=212_f5=2*cos(N*2*pi*fc/fs) and 114_f4=114_f5=−1. If a damping factor is used, the coefficients can be modified accordingly.

As indicated in FIG. 1, the encoder 100 can be configured to provide an encoded audio signal 120. Thereby, the encoder 100 can be configured to include in the encoded audio signal 120 quantized versions of the prediction errors for the plurality of individual spectral coefficients 106_t0_f2 or groups of spectral coefficients 106_t0_f4 and 106_t0_f5 to which predictive encoding is applied. Further, the encoder 100 can be configured to not include the prediction coefficients 112_f2 to 114_f5 in the encoded audio signal 120.

Thus, the encoder 100 may only use the prediction coefficients 112_f2 to 114_f5 for calculating the plurality of predicted individual spectral coefficients 110_t0_f2 or groups of predicted spectral coefficients 110_t0_f4 and 110_t0_f5 and therefrom the prediction errors between the predicted individual spectral coefficient 110_t0_f2 or group of predicted spectral coefficients 110_t0_f4 and 110_t0_f5 and the individual spectral coefficient 106_t0_f2 or group of predicted spectral coefficients 110_t0_f4 and 110_t0_f5 of the current frame, but will neither provide the individual spectral coefficients 106_t0_f4 (or a quantized version thereof) or groups of spectral coefficients 106_t0_f4 and 106_t0_f5 (or quantized versions thereof) nor the prediction coefficients 112_f2 to 114_f5 in the encoded audio signal 120. Hence, a decoder, an embodiment of which is described later with respect to FIG. 4, may derive the prediction coefficients 112_f2 to 114_f5 for calculating the plurality of predicted individual spectral coefficients or groups of predicted spectral coefficients for the current frame from the spacing value.

In other words, the encoder 100 can be configured to provide the encoded audio signal 120 including quantized versions of the prediction errors instead of quantized versions of the plurality of individual spectral coefficients 106_t0_f2 or of the groups of spectral coefficients 106_t0_f4 and 106_t0_f5 for the plurality of individual spectral coefficients 106_t0_f2 or groups of spectral coefficients 106_t0_f4 and 106_t0_f5 to which predictive encoding is applied.

Further, the encoder 100 can be configured to provide the encoded audio signal 102 including quantized versions of the spectral coefficients 106_t0_f3 by which the plurality of individual spectral coefficients 106_t0_f2 or groups of spectral coefficients 106_t0_f4 and 106_t0_f5 are separated, such that there is an alternation of spectral coefficients 106_t0_f2 or groups of spectral coefficients 106_t0_f4 and 106_t0_f5 for which quantized versions of the prediction errors are included in the encoded audio signal 120 and spectral coefficients 106_t0_f3 or groups of spectral coefficients for which quantized versions are provided without using predictive encoding.

In embodiments, the encoder 100 can be further configured to entropy encode the quantized versions of the prediction errors and the quantized versions of the spectral coefficients 106_t0_f3 by which the plurality of individual spectral coefficients 106_t0_f2 or groups of spectral coefficients 106_t0_f4 and 106_t0_f5 are separated, and to include the entropy encoded versions in the encoded audio signal 120 (instead of the non-entropy encoded versions thereof).

Figure 2:
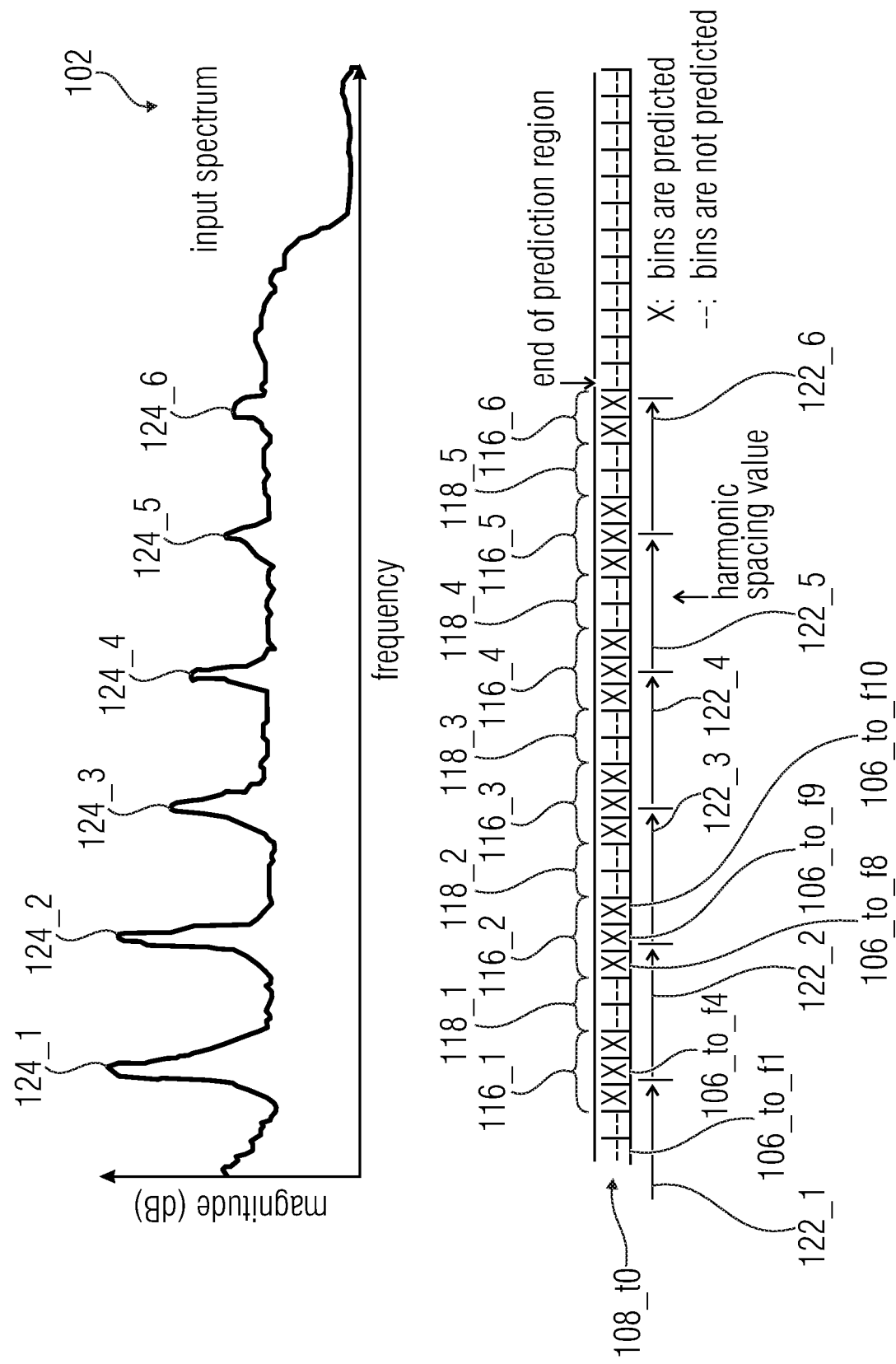
FIG. 2 shows in a diagram an amplitude of an audio signal plotted over frequency for a current frame and corresponding selected spectral coefficients to which predictive encoding is applied, according to an embodiment.

FIG. 2 shows in a diagram an amplitude of the audio signal 102 plotted over frequency for a current frame 108_t0. Further, in FIG. 2, the spectral coefficients in the transform domain or filter-bank domain determined by the encoder 100 for the current frame 108_t0 of the audio signal 102 are indicated.

As shown in FIG. 2, the encoder 100 can be configured to selectively apply prediction encoding to a plurality of groups 116_1 to 116_6 of spectral coefficients which are separated by at least one spectral coefficient. In detail, in the embodiment shown in FIG. 2, the encoder 100 selectively applies prediction encoding to six groups 116_1 to 116_6 of spectral coefficients, wherein each of the first five groups 116_1 to 116_5 of spectral coefficients includes three spectral coefficients (e.g., the second group 116_2 includes the spectral coefficients 106_t0_f8, 106_t0_f9 and 106_t0_f10), wherein the sixth group 116_6 of spectral coefficients includes two spectral coefficients. Thereby, the six groups 116_1 to 116_6 of spectral coefficients are separated by (five) groups 118_1 to 118_5 of spectral coefficients to which prediction encoding is not applied.

In other words, as indicated in FIG. 2, the encoder 100 can be configured to selectively apply prediction encoding to groups 116_1 to 110_6 of spectral coefficients, such that there is an alternation of groups 116_1 to 116_6 of spectral coefficients to which prediction encoding is applied and groups 118_1 to 118_5 of spectral coefficients to which prediction encoding is not applied.

In embodiments, the encoder 100 can be configured to determine a spacing value (indicated in FIG. 2 by the arrows 122_1 and 122_2), wherein the encoder 100 can be configured to select the plurality of groups 116_1 to 116_6 of spectral coefficients (or the plurality of individual spectral coefficients) to which predictive encoding is applied based on the spacing value.

The spacing value can be, for example, a spacing (or distance) between two characteristic frequencies of the audio signal 102, such as the peaks 124_1 and 124_2 of the audio signal. Further, the spacing value can be a an integer number of spectral coefficients (or indices of spectral coefficients) approximating the spacing between the two characteristic frequencies of the audio signal. Naturally, the spacing value can also be a real number or a fraction or multiple of the integer number of spectral coefficients describing the spacing between the two characteristic frequencies of the audio signal.

In embodiments, the encoder 100 can be configured to determine an instantaneous fundamental frequency of the audio signal (102) and to derive the spacing value from the instantaneous fundamental frequency or a fraction or a multiple thereof.

For example, the first peak 124_1 of the audio signal 102 can be an instantaneous fundamental frequency (or pitch, or first harmonic) of the audio signal 102. Therefore, the encoder 100 can be configured to determine the instantaneous fundamental frequency of the audio signal 102 and to derive the spacing value from the instantaneous fundamental frequency or a fraction or a multiple thereof. In that case, the spacing value can be an integer number (or a fraction, or a multiple thereof) of spectral coefficients approximating the spacing between the instantaneous fundamental frequency 124_1 and a second harmonic 124_2 of the audio signal 102.

Naturally, the audio signal 102 may comprise more than two harmonics. For example, the audio signal 102 shown in FIG. 2 comprises six harmonics 124_1 to 124_6 spectrally distributed such that the audio signal 102 comprises at every integer multiple of the instantaneous fundamental frequency a harmonic. Naturally, it also possible that the audio signal 102 does not comprise all but only some of the harmonics, such as the first, third and fifth harmonic.

In embodiments, the encoder 100 can be configured to select groups 116_1 to 116_6 of spectral coefficients (or individual spectral coefficients) spectrally arranged according to a harmonic grid defined by the spacing value for a predictive encoding. Thereby, the harmonic grid defined by the spacing value describes the periodic spectral distribution (equidistant spacing) of harmonics in the audio signal 102. In other words, the harmonic grid defined by the spacing value can be a sequence of spacing values describing the equidistant spacing of harmonics of the audio signal.

Further, the encoder 100 can be configured to select spectral coefficients (e.g. only those spectral coefficients), spectral indices of which are equal to or lie within a range (e.g. predetermined or variable) around a plurality of spectral indices derived on the basis of the spacing value, for a predictive encoding.

From the spacing value the indices (or numbers) of the spectral coefficients which represent the harmonics of the audio signal 102 can be derived. For example, assuming that a fourth spectral coefficient 106_t0_f4 represents the instantaneous fundamental frequency of the audio signal 102 and assuming that the spacing value is five, the spectral coefficient having the index nine can be derived on the basis of the spacing value. As can be seen in FIG. 2, the so derived spectral coefficient having the index nine, i.e. the ninth spectral coefficient 106_t0_f9, represents the second harmonic. Similarly, the spectral coefficients having the indices 14, 19, 24 and 29 can be derived, representing the third to sixth harmonics 124_3 to 124_6. However, not only spectral coefficients having the indices which are equal to the plurality of spectral indices derived on the basis of the spacing value may be predictively encoded, but also spectral coefficients having indices within a given range around the plurality of spectral indices derived on the basis of the spacing value. For instance, as shown in FIG. 2, the range can be three, such that not a plurality of individual spectral coefficients are selected for prediction encoding, but rather a plurality of groups of spectral coefficients.

Further, the encoder 100 can be configured to select the groups 116_1 to 116_6 of spectral coefficients (or plurality of individual spectral coefficients) to which predictive encoding is applied such that there is a periodic alternation, periodic with a tolerance of +/−1 spectral coefficient, between groups 116_1 to 116_6 of spectral coefficients (or the plurality of individual spectral coefficients) to which predictive encoding is applied and the spectral coefficients by which groups of spectral coefficients (or the plurality of individual spectral coefficients) to which predictive encoding is applied are separated. The tolerance of +/−1 spectral coefficient may be used when a distance between two harmonics of the audio signal 102 is not equal to an integer spacing value (integer with respect to indices or numbers of spectral coefficients) but rather to a fraction or multiple thereof. This can also be seen in FIG. 2 since the arrows 122_1 to 122_6 do not always point exactly to the center or middle of the corresponding spectral coefficients.

In other words, the audio signal 102 can comprise at least two harmonic signal components 124_1 to 124_6, wherein the encoder 100 can be configured to selectively apply predictive encoding to those plurality of groups 116_1 to 116_6 of spectral coefficients (or individual spectral coefficients) which represent the at least two harmonic signal components 124_1 to 124_6 or spectral environments around the at least two harmonic signal components 124_1 to 124_6 of the audio signal 102. The spectral environments around the at least two harmonic signal components 124_1 to 124_6 can be, for example, +/−1, 2, 3, 4 or 5 spectral components.

Thereby, the encoder 100 can be configured to not apply predictive encoding to those groups 118_1 to 118_5 of spectral coefficients (or plurality of individual spectral coefficients) which do not represent the at least two harmonic signal components 124_1 to 124_6 or spectral environments of the at least two harmonic signal components 124_1 to 124_6 of the audio signal 102. In other words, the encoder 100 can be configured to not apply predictive encoding to those plurality of groups 118_1 to 118_5 of spectral coefficients (or individual spectral coefficients) which belong to a non-tonal background noise between signal harmonics 124_1 to 124_6.

Further, the encoder 100 can be configured to determine a harmonic spacing value indicating a spectral spacing between the at least two harmonic signal components 124_1 to 124_6 of the audio signal 102, the harmonic spacing value indicating those plurality of individual spectral coefficients or groups of spectral coefficients which represent the at least two harmonic signal components 124_1 to 124_6 of the audio signal 102.

Furthermore, the encoder 100 can be configured to provide the encoded audio signal 120 such that the encoded audio signal 120 includes the spacing value (e.g., one spacing value per frame) or (alternatively) a parameter from which the spacing value can be directly derived.

Figure 3:
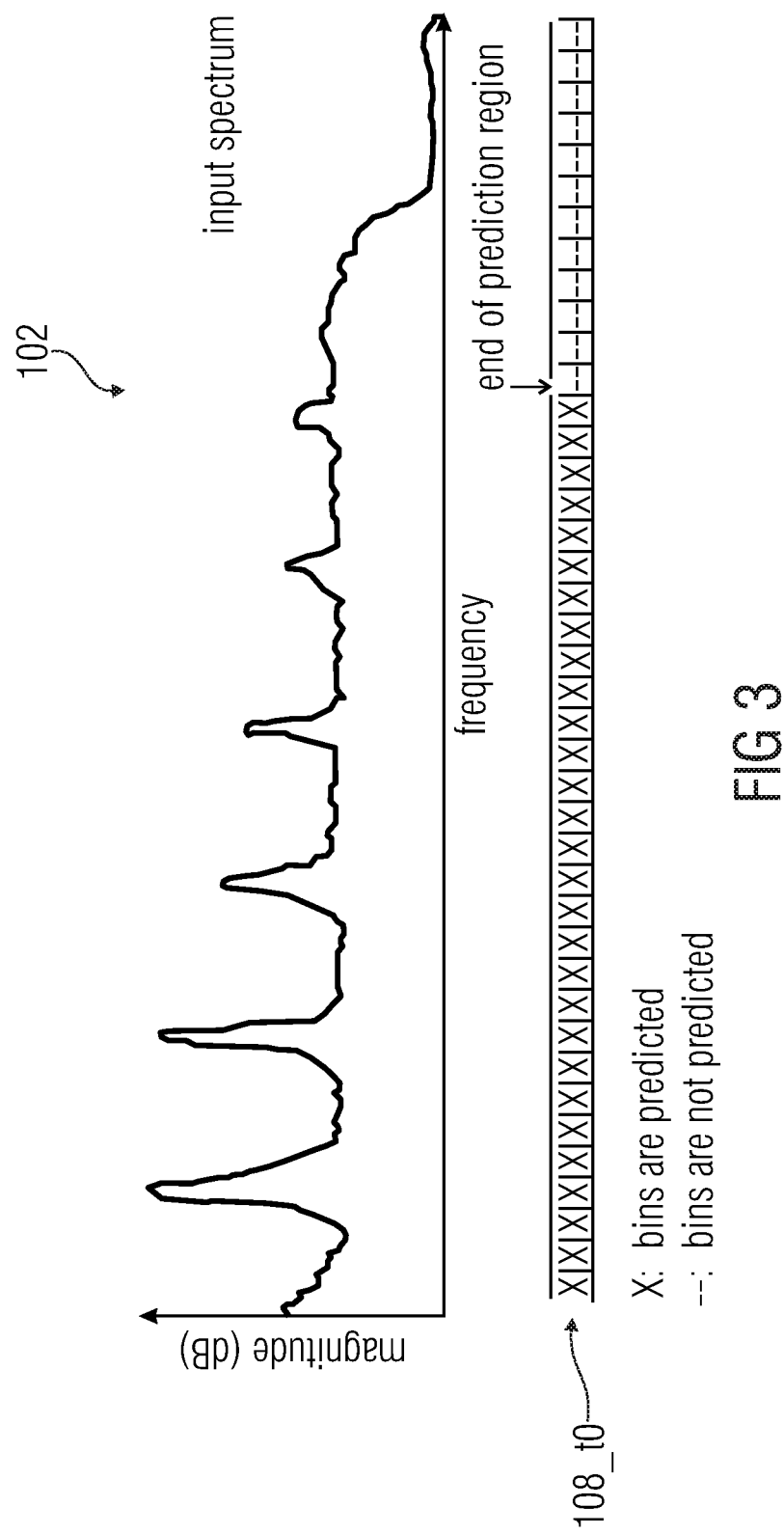
FIG. 3 shows in a diagram an amplitude of an audio signal plotted over frequency for a current frame and corresponding spectral coefficients which are subjected to prediction according to MPEG-2 AAC.

Embodiments of the present invention address the above-mentioned two issues of the FDP method by introducing a harmonic spacing value into the FDP process, signaled from the encoder (transmitter) 100 to a respective decoder (receiver) such that both can operate in a fully synchronized fashion. Said harmonic spacing value may serve as an indicator of an instantaneous fundamental frequency (or pitch) of one or more spectra associated with a frame to be coded and identifies which spectral bins (spectral coefficients) shall be predicted. More specifically, only those spectral coefficients around harmonic signal components located (in terms of their indexing) at integer multiples of the fundamental pitch (as defined by the harmonic spacing value) shall be subjected to the prediction. FIGS. 2 and 3 illustrate this pitch-adaptive prediction approach by means of a simple example, wherein FIG. 3 shows the operation of the state-of-the-art predictor in MPEG-2 AAC, which does not predict only around a harmonic grid but subjects every spectral bin below a certain stop frequency to prediction, and wherein FIG. 2 depicts the same predictor with a modification according to an embodiment integrated to perform the prediction only on those "tonal" bins which are close to the harmonic spacing grid.

Comparing FIGS. 2 and 3 reveals two advantages of the modification according to an embodiment, namely (1) much fewer spectral bins are included in the prediction process, reducing complexity (in the given example by roughly 40% since only three fifths of the bins are predicted), and (2) the bins belonging to the non-tonal background noise between the signals harmonics are not affected by prediction, which should increase the efficiency of the prediction.

Note that the harmonic spacing value does not necessarily need to correspond to the actual instantaneous pitch of the input signal but that it could represent a fraction or multiple of the true pitch if this yields an overall improvement of the efficiency of the prediction process. In addition, it may be emphasized that the harmonic spacing value does not have to reflect an integer multiple of the bin indexing or bandwidth unit but may include a fraction of said units.

Subsequently, an advantageous implementation into an MPEG-style audio coder is described.

The pitch-adaptive prediction is advantageously integrated into the MPEG-2 AAC [ISO/IEC 13818-7, "Information technology—Part 7: Advanced Audio Coding (AAC)," 2006.] or, utilizing a similar predictor as in AAC, into the MPEG-H 3D audio codec [ISO/IEC 23008-3, "Information technology—High efficiency coding, part 3: 3D audio," 2015.]. In particular, a one-bit flag can be written to, and read from, a respective bit-stream for each frame and channel which is not independently coded (for independent frame channels, the flag may not be transmitted since prediction can be disabled to ensure the independence). If the flag is set to one, another 8 bits can be written and read. These 8 bits represent a quantized version of (e.g. an index to) the harmonic spacing value for the given frame and channel. Employing the harmonic spacing value derived from the quantized version using either a linear or non-linear mapping function, the prediction process can be carried out in the manner according to an embodiment shown in FIG. 2. Advantageously, only bins located within a maximal distance of 1.5 bins around the harmonic grid are subjected to the prediction. For example, if the harmonic spacing value indicates a harmonic line at bin index 47.11, then only the bins at indices 46, 47 and 48 are predicted. Said maximal distance, however, could be specified differently, either fixed a-priori for all channels and frames or separately for each frame and channel based on the harmonic spacing value.

Figure 4:
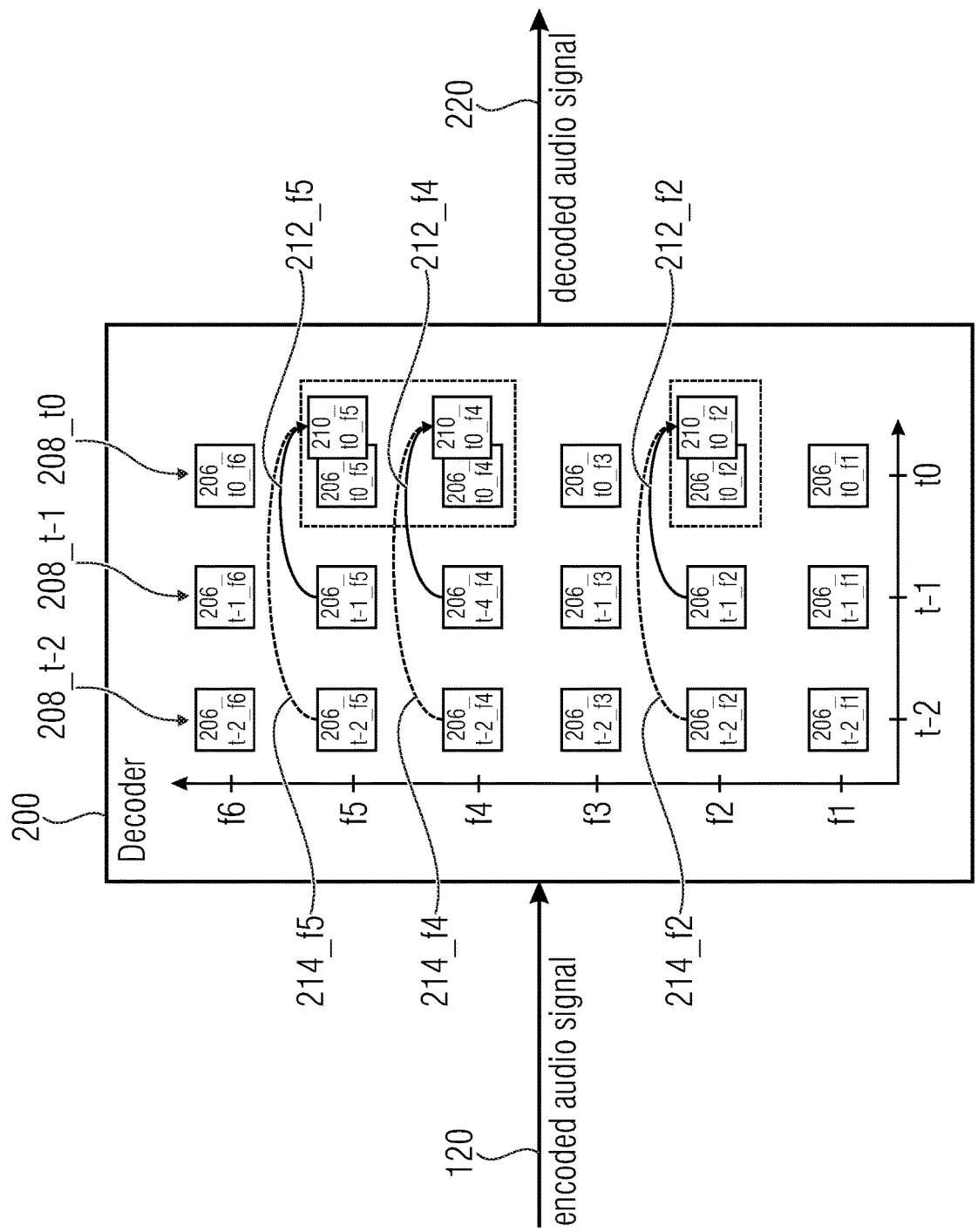
FIG. 4 shows a schematic block diagram of a decoder for decoding an encoded audio signal, according to an embodiment.

FIG. 4 shows a schematic block diagram of a decoder 200 for decoding an encoded signal 120. The decoder 200 is configured to decode the encoded audio signal 120 in a transform domain or filter-bank domain 204, wherein the decoder 200 is configured to parse the encoded audio signal 120 to obtain encoded spectral coefficients $206\_t0\_f1$ to $206\_t0\_f6$ of the audio signal for a current frame $208\_t0$ and encoded spectral coefficients $206\_t\text{-}1\_f0$ to $206\_t\text{-}1\_f6$ for at least one previous frame $208\_t\text{-}1$, and wherein the decoder 200 is configured to selectively apply predictive decoding to a plurality of individual encoded spectral coefficients or groups of encoded spectral coefficients which are separated by at least one encoded spectral coefficient.

In embodiments, the decoder 200 can be configured to apply the predictive decoding to a plurality of individual encoded spectral coefficients which are separated by at least one encoded spectral coefficient, such as to two individual encoded spectral coefficients which are separated by at least one encoded spectral coefficient. Further, the decoder 200 can be configured to apply the predictive decoding to a plurality of groups of encoded spectral coefficients (each of the groups comprising at least two encoded spectral coefficients) which are separated by at least one encoded spectral coefficients, such as to two groups of encoded spectral coefficients which are separated by at least one encoded spectral coefficient. Further, the decoder 200 can be configured to apply the predictive decoding to a plurality of individual encoded spectral coefficients and/or groups of encoded spectral coefficients which are separated by at least one encoded spectral coefficient, such as to at least one individual encoded spectral coefficient and at least one group of encoded spectral coefficients which are separated by at least one encoded spectral coefficient.

In the example shown in FIG. 4, the decoder 200 is configured to determine six encoded spectral coefficients $206\_t0\_f1$ to $206\_t0\_f6$ for the current frame $208\_t0$ and six encoded spectral coefficients $206\_t\text{-}1\_f1$ to $206\_t\text{-}1\_f6$ for the previous frame $208\_t\text{-}1$. Thereby, the decoder 200 is configured to selectively apply predictive decoding to the individual second encoded spectral coefficient $206\_t0\_f2$ of the current frame and to the group of encoded spectral coefficients consisting of the fourth and fifth encoded spectral coefficients $206\_t0\_f4$ and $206\_t0\_f5$ of the current frame $208\_t0$. As can be seen, the individual second encoded spectral coefficient $206\_t0\_f2$ and the group of encoded spectral coefficients consisting of the fourth and fifth encoded spectral coefficients $206\_t0\_f4$ and $206\_t0\_f5$ are separated from each other by the third encoded spectral coefficient $206\_t0\_f3$.

Note that the term "selectively" as used herein refers to applying predictive decoding (only) to selected encoded spectral coefficients. In other words, predictive decoding is not applied to all encoded spectral coefficients, but rather only to selected individual encoded spectral coefficients or groups of encoded spectral coefficients, the selected individual encoded spectral coefficients and/or groups of encoded spectral coefficients being separated from each other by at least one encoded spectral coefficient. In other words, predictive decoding is not applied to the at least one encoded spectral coefficient by which the selected plurality of individual encoded spectral coefficients or groups of encoded spectral coefficients are separated.

In embodiments the decoder 200 can be configured to not apply the predictive decoding to the at least one encoded spectral coefficient $206\_t0\_f3$ by which the individual encoded spectral coefficients $206\_t0\_f2$ or the group of spectral coefficients $206\_t0\_f4$ and $206\_t0\_f5$ are separated.

The decoder 200 can be configured to entropy decode the encoded spectral coefficients, to obtain quantized prediction errors for the spectral coefficients $206\_t0\_f2$, $2016\_t0\_f4$ and $206\_t0\_f5$ to which predictive decoding is to be applied and quantized spectral coefficients $206\_t0\_f3$ for the at least one spectral coefficient to which predictive decoding is not to be applied. Thereby, the decoder 200 can be configured to apply the quantized prediction errors to a plurality of predicted individual spectral coefficients $210\_t0\_f2$ or groups of predicted spectral coefficients $210\_t0\_f4$ and $210\_t0\_f5$, to obtain, for the current frame $208\_t0$, decoded spectral coefficients associated with the encoded spectral coefficients 206_t0_f2, 206_t0_f4 and 206_t0_f5 to which predictive decoding is applied.

For example, the decoder 200 can be configured to obtain a second quantized prediction error for a second quantized spectral coefficient 206_t0_f2 and to apply the second quantized prediction error to the predicted second spectral coefficient 210_t0_f2, to obtain a second decoded spectral coefficient associated with the second encoded spectral coefficient 206_t0_f2, wherein the decoder 200 can be configured to obtain a fourth quantized prediction error for a fourth quantized spectral coefficient 206_t0_f4 and to apply the fourth quantized prediction error to the predicted fourth spectral coefficient 210_t0_f4, to obtain a fourth decoded spectral coefficient associated with the fourth encoded spectral coefficient 206_t0_f4, and wherein the decoder 200 can be configured to obtain a fifth quantized prediction error for a fifth quantized spectral coefficient 206_t0_f5 and to apply the fifth quantized prediction error to the predicted fifth spectral coefficient 210_t0_f5, to obtain a fifth decoded spectral coefficient associated with the fifth encoded spectral coefficient 206_t0_f5.

Further, the decoder 200 can be configured to determine the plurality of predicted individual spectral coefficients 210_t0_f2 or groups of predicted spectral coefficients 210_t0_f4 and 210_t0_f5 for the current frame 208_t0 based on a corresponding plurality of the individual encoded spectral coefficients 206_t-1_f2 (e.g., using a plurality of previously decoded spectral coefficients associated with the plurality of the individual encoded spectral coefficients 206_t-1_f2) or groups of encoded spectral coefficients 206_t-1_f4 and 206_t-1_f5 (e.g., using groups of previously decoded spectral coefficients associated with the groups of encoded spectral coefficients 206_t-1_f4 and 206_t-1_f5) of the previous frame 208_t-1.

For example, the decoder 200 can be configured to determine the second predicted spectral coefficient 210_t0_f2 of the current frame 208_t0 using a previously decoded (quantized) second spectral coefficient associated with the second encoded spectral coefficient 206_t-1_f2 of the previous frame 208_t-1, the fourth predicted spectral coefficient 210_t0_f4 of the current frame 208_t0 using a previously decoded (quantized) fourth spectral coefficient associated with the fourth encoded spectral coefficient 206_t-1_f4 of the previous frame 208_t-1, and the fifth predicted spectral coefficient 210_t0_f5 of the current frame 208_t0 using a previously decoded (quantized) fifth spectral coefficient associated with the fifth encoded spectral coefficient 206_t-1_f5 of the previous frame 208_t-1.

Furthermore, the decoder 200 can be configured to derive prediction coefficients from the spacing value, and wherein the decoder 200 can be configured to calculate the plurality of predicted individual spectral coefficients 210_t0_f2 or groups of predicted spectral coefficients 210_t0_f4 and 210_t0_f5 for the current frame 208_t0 using a corresponding plurality of previously decoded individual spectral coefficients or groups of previously decoded spectral coefficients of at least two previous frames 208_t-1 and 208_t-2 and using the derived prediction coefficients.

For example, the decoder 200 can be configured to derive prediction coefficients 212_f2 and 214_f2 for the second encoded spectral coefficient 206_t0_f2 from the spacing value, to derive prediction coefficients 212_f4 and 214_f4 for the fourth encoded spectral coefficient 206_t0_f4 from the spacing value, and to derive prediction coefficients 212_f5 and 214_f5 for the fifth encoded spectral coefficient 206_t0_f5 from the spacing value.

Note that the decoder 200 can be configured to decode the encoded audio signal 120 in order to obtain quantized prediction errors instead of a plurality of individual quantized spectral coefficients or groups of quantized spectral coefficients for the plurality of individual encoded spectral coefficients or groups of encoded spectral coefficients to which predictive decoding is applied.

Further, the decoder 200 can be configured to decode the encoded audio signal 120 in order to obtain quantized spectral coefficients by which the plurality of individual spectral coefficients or groups of spectral coefficients are separated, such that there is an alternation of encoded spectral coefficients 206_t0_f2 or groups of encoded spectral coefficients 206_t0_f4 and 206_t0_f5 for which quantized prediction errors are obtained and encoded spectral coefficients 206_t0_f3 or groups of encoded spectral coefficients for which quantized spectral coefficients are obtained.

The decoder 200 can be configured to provide a decoded audio signal 220 using the decoded spectral coefficients associated with the encoded spectral coefficients 206_t0_f2, 206_t0_f4 and 206_t0_f5 to which predictive decoding is applied, and using entropy decoded spectral coefficients associated with the encoded spectral coefficients 206_t0_f1, 206_t0_f3 and 206_t0_f6 to which predictive decoding is not applied.

In embodiments, the decoder 200 can be configured to obtain a spacing value, wherein the decoder 200 can be configured to select the plurality of individual encoded spectral coefficients 206_t0_f2 or groups of encoded spectral coefficients 206_t0_f4 and 206_t0_f5 to which predictive decoding is applied based on the spacing value.

As already mentioned above with respect to the description of the corresponding encoder 100, the spacing value can be, for example, a spacing (or distance) between two characteristic frequencies of the audio signal. Further, the spacing value can be a an integer number of spectral coefficients (or indices of spectral coefficients) approximating the spacing between the two characteristic frequencies of the audio signal. Naturally, the spacing value can also be a fraction or multiple of the integer number of spectral coefficients describing the spacing between the two characteristic frequencies of the audio signal.

The decoder 200 can be configured to select individual spectral coefficients or groups of spectral coefficients spectrally arranged according to a harmonic grid defined by the spacing value for a predictive decoding. The harmonic grid defined by the spacing value may describe the periodic spectral distribution (equidistant spacing) of harmonics in the audio signal 102. In other words, the harmonic grid defined by the spacing value can be a sequence of spacing values describing the equidistant spacing of harmonics of the audio signal 102.

Furthermore, the decoder 200 can be configured to select spectral coefficients (e.g. only those spectral coefficients), spectral indices of which are equal to or lie within a range (e.g. predetermined or variable range) around a plurality of spectral indices derived on the basis of the spacing value, for a predictive decoding. Thereby, the decoder 200 can be configured to set a width of the range in dependence on the spacing value.

In embodiments, the encoded audio signal can comprise the spacing value or an encoded version thereof (e.g., a parameter from which the spacing value can be directly derived), wherein the decoder 200 can be configured to extract the spacing value or the encoded version thereof from the encoded audio signal to obtain the spacing value.

Alternatively, the decoder 200 can be configured to determine the spacing value by itself, i.e. the encoded audio signal does not include the spacing value. In that case, the decoder 200 can be configured to determine an instantaneous fundamental frequency (of the encoded audio signal 120 representing the audio signal 102) and to derive the spacing value from the instantaneous fundamental frequency or a fraction or a multiple thereof.

In embodiments, the decoder 200 can be configured to select the plurality of individual spectral coefficients or groups of spectral coefficients to which predictive decoding is applied such that there is a periodic alternation, periodic with a tolerance of +/−1 spectral coefficient, between the plurality of individual spectral coefficients or groups of spectral coefficients to which predictive decoding is applied and the spectral coefficients by which the plurality of individual spectral coefficients or groups of spectral coefficients to which predictive decoding is applied are separated.

In embodiments, the audio signal 102 represented by the encoded audio signal 120 comprises at least two harmonic signal components, wherein the decoder 200 is configured to selectively apply predictive decoding to those plurality of individual encoded spectral coefficients $206\_t0\_f2$ or groups of encoded spectral coefficients $206\_t0\_f4$ and $206\_t0\_f5$ which represent the at least two harmonic signal components or spectral environments around the at least two harmonic signal components of the audio signal 102. The spectral environments around the at least two harmonic signal components can be, for example, +/−1, 2, 3, 4 or 5 spectral components.

Thereby, the decoder 200 can be configured to identify the at least two harmonic signal components, and to selectively apply predictive decoding to those plurality of individual encoded spectral coefficients $206\_t0\_f2$ or groups of encoded spectral coefficients $206\_t0\_f4$ and $206\_t0\_f5$ which are associated with the identified harmonic signal components, e.g., which represent the identified harmonic signal components or which surround the identified harmonic signal components).

Alternatively, the encoded audio signal 120 may comprise an information (e.g., the spacing value) identifying the at least two harmonic signal components. In that case, the decoder 200 can be configured to selectively apply predictive decoding to those plurality of individual encoded spectral coefficients $206\_t0\_f2$ or groups of encoded coefficients $206\_t0\_f4$ and $206\_t0\_f5$ which are associated with the identified harmonic signal components, e.g., which represent the identified harmonic signal components or which surround the identified harmonic signal components).

In both of the aforementioned alternatives, the decoder 200 can be configured to not apply predictive decoding to those plurality of individual encoded spectral coefficients $206\_t0\_f3$, $206\_t0\_f1$ and $206\_t0\_f6$ or groups of encoded spectral coefficients which do not represent the at least two harmonic signal components or spectral environments of the at least two harmonic signal components of the audio signal 102.

In other words, the decoder 200 can be configured to not apply predictive decoding to those plurality of individual encoded spectral coefficients $206\_t0\_f3$, $206\_t0\_f1$, $206\_t0\_f6$ or groups of encoded spectral coefficients which belong to a non-tonal background noise between signal harmonics of the audio signal 102.

FIG. 5 shows a flowchart of a method 300 for encoding an audio signal, according to an embodiment. The method 300 comprises a step 302 of determining spectral coefficients of the audio signal for a current frame and at least one previous frame, and a step 304 of selectively applying predictive encoding to a plurality of individual spectral coefficients or groups of spectral coefficients which are separated by at least one spectral coefficient.

FIG. 6 shows a flowchart of a method 400 for decoding an encoded audio signal, according to an embodiment. The method 400 comprises a step 402 of parsing the encoded audio signal to obtain encoded spectral coefficients of the audio signal for a current frame and at least one previous frame, and a step 404 of selectively applying predictive decoding to a plurality of individual encoded spectral coefficients or groups of encoded spectral coefficients which are separated by at least one encoded spectral coefficient.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An encoder for encoding an audio signal, wherein the encoder comprises a processor operable to execute computer program instructions and a memory operable to store computer program instructions executable by the processor, for performing the steps of
   encoding the audio signal in a transform domain or filter-bank domain,
   determining spectral coefficients of the audio signal for a current frame and at least one previous frame,
   determining a spacing value, wherein the spacing value is a harmonic spacing value describing a spacing between harmonics,
   selectively applying predictive encoding to a plurality of individual spectral coefficients or groups of spectral coefficients based on the spacing value,
   selecting the plurality of individual spectral coefficients or groups of spectral coefficients to which predictive encoding is applied based on the spacing value,
   wherein the spacing value indicates those plurality of individual encoded spectral coefficients or groups of encoded spectral coefficients which represent at least two harmonic signal components of the audio signal.

2. The encoder according to claim 1, wherein the plurality of individual spectral coefficients or groups of spectral coefficients are separated by at least one spectral coefficient.

3. The encoder according to claim 2, wherein the predictive encoding is not applied to the at least one spectral coefficient by which the individual spectral coefficients or the groups of spectral coefficients are separated.

4. The encoder according to claim 1, comprising the processor and the memory for performing the step of
   encoding the plurality of individual spectral coefficients or the groups of spectral coefficients of the current frame, by coding prediction errors between a plurality of predicted individual spectral coefficients or groups of predicted spectral coefficients of the current frame and the plurality of individual spectral coefficients or groups of spectral coefficients of the current frame.

5. The encoder according to claim 4, comprising the processor and the memory for performing the steps of
   deriving prediction coefficients from the spacing value, and
   calculating the plurality of predicted individual spectral coefficients or groups of predicted spectral coefficients for the current frame using a corresponding plurality of individual spectral coefficients or corresponding groups of spectral coefficients of at least two previous frames and using the derived prediction coefficients.

6. The encoder according to claim 5, comprising the processor and the memory for performing the step of
   providing an encoded audio signal, the encoded audio signal not comprising the prediction coefficients or encoded versions thereof.

7. The encoder according to claim 4, comprising the processor and the memory for performing the step of
   determining the plurality of predicted individual spectral coefficients or groups of predicted spectral coefficients for the current frame using corresponding quantized versions of the plurality of individual spectral coefficients or the groups of spectral coefficients of the previous frame.

8. The encoder according to claim 7, comprising the processor and the memory for performing the steps of
   deriving prediction coefficients from the spacing value, and
   calculating the plurality of predicted individual spectral coefficients or groups of predicted spectral coefficients for the current frame using corresponding quantized versions of the plurality of individual spectral coefficients or the groups of spectral coefficients of at least two previous frames and using the derived prediction coefficients.

9. The encoder according to claim 4, comprising the processor and the memory for performing the step of
   providing an encoded audio signal, the encoded audio signal comprising quantized versions of the prediction errors instead of quantized versions of the plurality of individual spectral coefficients or of the groups of spectral coefficients for the plurality of individual spectral coefficients or groups of spectral coefficients to which predictive encoding is applied.

10. The encoder according to claim 9, wherein the encoded audio signal comprises quantized versions of the spectral coefficients to which predictive encoding is not applied, such that there is an alternation of spectral coefficients or groups of spectral coefficients for which quantized versions of the prediction errors are comprised in the encoded audio signal and spectral coefficients or groups of spectral coefficients for which quantized versions are provided without using predictive encoding.

11. The encoder according to claim 1, comprising the processor and the memory for performing the steps of determining an instantaneous fundamental frequency of the audio signal and deriving the spacing value from the instantaneous fundamental frequency or a fraction or a multiple thereof.

12. The encoder according to claim 1, comprising the processor and the memory for performing the step of
selecting individual spectral coefficients or groups of spectral coefficients spectrally arranged according to a harmonic grid defined by the spacing value for a predictive encoding.

13. The encoder according to claim 1, comprising the processor and the memory for performing the step of
selecting spectral coefficients, spectral indices of which are equal to or lie within a range around a plurality of spectral indices derived on the basis of the spacing value, for a predictive encoding.

14. The encoder according to claim 13, comprising the processor and the memory for performing the step of
setting a width of the range in dependence on the spacing value.

15. The encoder according to claim 1, comprising the processor and the memory for performing the step of
selecting the plurality of individual spectral coefficients or groups of spectral coefficients to which predictive encoding is applied such that there is a periodic alternation, periodic with a tolerance of +/−1 spectral coefficient, between the plurality of individual spectral coefficients or groups of spectral coefficients to which predictive encoding is applied and the spectral coefficients or groups of spectral coefficients to which predictive encoding is not applied.

16. The encoder according to claim 1, wherein the audio signal comprises at least two harmonic signal components, the encoder comprising the processor and the memory for performing the step of
selectively applying predictive encoding to those plurality of individual spectral coefficients or groups of spectral coefficients which represent the at least two harmonic signal components or spectral environments around the at least two harmonic signal components of the audio signal.

17. The encoder according to claim 16, comprising the processor and the memory for performing the step of
not applying predictive encoding to those plurality of individual spectral coefficients or groups of spectral coefficients which do not represent the at least two harmonic signal components or spectral environments of the at least two harmonic signal components of the audio signal.

18. The encoder according to claim 16, comprising the processor and the memory for performing the step of
not applying predictive encoding to those plurality of individual spectral coefficients or groups of spectral coefficients which belong to a non-tonal background noise between signal harmonics.

19. The encoder according to claim 16, wherein the spacing value is a harmonic spacing value indicating a spectral spacing between the at least two harmonic signal components of the audio signal, the harmonic spacing value indicating those plurality of individual spectral coefficients or groups of spectral coefficients which represent the at least two harmonic signal components of the audio signal.

20. The encoder according to claim 1, comprising the processor and the memory for performing the step of
providing an encoded audio signal,
including in the encoded audio signal the spacing value or an encoded version thereof.

21. The encoder according to claim 1, wherein the spectral coefficients are spectral bins.

22. A decoder for decoding an encoded audio signal to produce a decoded audio signal, wherein the decoder comprises a processor operable to execute computer program instructions and a memory operable to store computer program instructions executable by the processor, for performing the steps of:
decoding the encoded audio signal in a transform domain or filter-bank domain,
acquiring a spacing value, wherein the spacing value is a harmonic spacing value describing a spacing between harmonics,
parsing the encoded audio signal to acquire encoded spectral coefficients of the audio signal for a current frame and at least one previous frame, and wherein the decoder is configured to selectively apply predictive decoding to a plurality of individual encoded spectral coefficients or groups of encoded spectral coefficients based on the spacing value,
selecting the plurality of individual encoded spectral coefficients or groups of encoded spectral coefficients to which predictive decoding is applied based on the spacing value,
wherein the spacing value indicates those plurality of individual encoded spectral coefficients or groups of encoded spectral coefficients which represent at least two harmonic signal components of the audio signal.

23. The decoder according to claim 22, wherein the plurality of individual encoded spectral coefficients or groups of encoded spectral coefficients are separated by at least one encoded spectral coefficient.

24. The decoder according to claim 23, wherein the predictive decoding is not applied to the at least one spectral coefficient by which the individual spectral coefficients or the group of spectral coefficients are separated.

25. The decoder according to claim 22, comprising the processor and the memory for performing the steps of
entropy decoding the encoded spectral coefficients, to acquire quantized prediction errors for the spectral coefficients to which predictive decoding is to be applied and quantized spectral coefficients for spectral coefficients to which predictive decoding is not to be applied; and
applying the quantized prediction errors to a plurality of predicted individual spectral coefficients or groups of predicted spectral coefficients, to acquire, for the current frame, decoded spectral coefficients associated with the encoded spectral coefficients to which predictive decoding is applied.

26. The decoder according to claim 25, comprising the processor and the memory for performing the step of
determining the plurality of predicted individual spectral coefficients or groups of predicted spectral coefficients for the current frame based on a corresponding plurality of the individual encoded spectral coefficients or groups of encoded spectral coefficients of the previous frame.

27. The decoder according to claim 26, comprising the processor and the memory for performing the steps of
deriving prediction coefficients from the spacing value,
calculating the plurality of predicted individual spectral coefficients or groups of predicted spectral coefficients for the current frame using a corresponding plurality of previously decoded individual spectral coefficients or groups of previously decoded spectral coefficients of at least two previous frames and using the derived prediction coefficients.

28. The decoder according to claim 23, comprising the processor and the memory for performing the step of
decoding the encoded audio signal in order to acquire quantized prediction errors instead of a plurality of individual quantized spectral coefficients or groups of quantized spectral coefficients for the plurality of individual encoded spectral coefficients or groups of encoded spectral coefficients to which predictive decoding is applied.

29. The decoder according to claim 28, comprising the processor and the memory for performing the step of
decoding the encoded audio signal in order to acquire quantized spectral coefficients for encoded spectral coefficients to which predictive decoding is not applied, such that there is an alternation of encoded spectral coefficients or groups of encoded spectral coefficients for which quantized prediction errors are acquired and encoded spectral coefficients or groups of encoded spectral coefficients for which quantized spectral coefficients are acquired.

30. The decoder according to claim 22, comprising the processor and the memory for performing the step of
selecting individual spectral coefficients or groups of spectral coefficients spectrally arranged according to a harmonic grid defined by the spacing value for a predictive decoding.

31. The decoder according to claim 22, comprising the processor and the memory for performing the step of
selecting spectral coefficients, spectral indices of which are equal to or lie within a range around a plurality of spectral indices derived on the basis of the spacing value, for a predictive decoding.

32. The decoder according to claim 31, comprising the processor and the memory for performing the step of
setting a width of the range in dependence on the spacing value.

33. The decoder according to claim 22, wherein the encoded audio signal comprises the spacing value or an encoded version thereof, the decoder comprising the processor and the memory for performing the step of
extracting the spacing value or the encoded version thereof from the encoded audio signal to acquire the spacing value.

34. The decoder according to claim 22, comprising the processor and the memory for performing the step of
determining the spacing value.

35. The decoder according to claim 34, comprising the processor and the memory for performing the steps of
determining an instantaneous fundamental frequency and deriving the spacing value from the instantaneous fundamental frequency or a fraction or a multiple thereof.

36. The decoder according to claim 22, comprising the processor and the memory for performing the step of
selecting the plurality of individual spectral coefficients or groups of spectral coefficients to which predictive decoding is applied such that there is a periodic alternation, periodic with a tolerance of +/−1 spectral coefficients, between the plurality of individual spectral coefficients or groups of spectral coefficients to which predictive decoding is applied and the spectral coefficients to which predictive decoding is not applied.

37. The decoder according to claim 23, wherein the audio signal represented by the encoded audio signal comprises at least two harmonic signal components, the decoder comprising the processor and the memory for performing the step of
applying predictive decoding to those plurality of individual encoded spectral coefficients or groups of encoded spectral coefficients which represent the at least two harmonic signal components or spectral environments around the at least two harmonic signal components of the audio signal.

38. The decoder according to claim 37, comprising the processor and the memory for performing the steps of
identifying the at least two harmonic signal components, and selectively applying predictive decoding to those plurality of individual encoded spectral coefficients or groups of encoded spectral coefficients which are associated with the identified harmonic signal components.

39. The decoder according to claim 37, wherein the encoded audio signal comprises the spacing value or an encoded version thereof, wherein the spacing value identifies the at least two harmonic signal components, the decoder comprising the processor and the memory for performing the step of
applying predictive decoding to those plurality of individual encoded spectral coefficients or groups of encoded spectral coefficients which are associated with the identified harmonic signal components.

40. The decoder according to claim 37, comprising the processor and the memory for performing the step of
not applying predictive decoding to those plurality of individual encoded spectral coefficients or groups of encoded spectral coefficients which do not represent the at least two harmonic signal components or spectral environments of the at least two harmonic signal components of the audio signal.

41. The decoder according to claim 37, comprising the processor and the memory for performing the step of
not applying predictive decoding to those plurality of individual encoded spectral coefficients or groups of encoded spectral coefficients which belong to a non-tonal background noise between signal harmonics of the audio signal.

42. The decoder according to claim 22, wherein the encoded audio signal comprises the spacing value or an encoded version thereof, wherein the spacing value is a harmonic spacing value, the harmonic spacing value indicating those plurality of individual encoded spectral coefficients or groups of encoded spectral coefficients which represent at least two harmonic signal components of the audio signal.

43. The decoder according to claim 22, wherein the spectral coefficients are spectral bins.

44. Method for encoding an audio signal in a transform domain or filter-bank domain using an encoder comprising a processor operable to execute computer program instructions and a memory operable to store computer program instructions executable by the processor, the method comprising:
determining spectral coefficients of the audio signal for a current frame and at least one previous frame;
determining a spacing value, wherein the spacing value is a harmonic spacing value describing a spacing between harmonics; and
selectively applying predictive encoding to a plurality of individual spectral coefficients or groups of spectral coefficients based on the spacing value, wherein the plurality of individual spectral coefficients or groups of spectral coefficients to which predictive encoding is applied are selected based on the spacing value, wherein the spacing value indicates those plurality of individual encoded spectral coefficients or groups of encoded spectral coefficients which represent at least two harmonic signal components of the audio signal.

45. Method for decoding an encoded audio signal in a transform domain or filter-bank domain to produce a decoded audio signal, using a decoder comprising a processor operable to execute computer program instructions and a memory operable to store computer program instructions executable by the processor, the method comprising:

parsing the encoded audio signal to acquire encoded spectral coefficients of the audio signal for a current frame and at least one previous frame;

acquiring a spacing value, wherein the spacing value is a harmonic spacing value describing a spacing between harmonics; and selectively applying predictive decoding to a plurality of individual encoded spectral coefficients or groups of encoded spectral coefficients based on the spacing value, wherein the plurality of individual encoded spectral coefficients or groups of encoded spectral coefficients to which predictive decoding is applied are selected based on the spacing value, wherein the spacing value indicates those plurality of individual encoded spectral coefficients or groups of encoded spectral coefficients which represent at least two harmonic signal components of the audio signal.

46. A non-transitory digital storage medium having a computer program stored thereon to perform the method for encoding an audio signal in a transform domain or filter-bank domain, the method comprising:

determining spectral coefficients of the audio signal for a current frame and at least one previous frame;

determining a spacing value, wherein the spacing value is a harmonic spacing value describing a spacing between harmonics; and selectively applying predictive encoding to a plurality of individual spectral coefficients or groups of spectral coefficients based on the spacing value, wherein the plurality of individual spectral coefficients or groups of spectral coefficients to which predictive encoding is applied are selected based on the spacing value, wherein the spacing value indicates those plurality of individual encoded spectral coefficients or groups of encoded spectral coefficients which represent at least two harmonic signal components of the audio signal when said computer program is run by a computer.

47. A non-transitory digital storage medium having a computer program stored thereon to perform the method for decoding an encoded audio signal in a transform domain or filter-bank domain to produce a decoded audio signal, the method comprising:

parsing the encoded audio signal to acquire encoded spectral coefficients of the audio signal for a current frame and at least one previous frame;

acquiring a spacing value, wherein the spacing value is a harmonic spacing value describing a spacing between harmonics; and selectively applying predictive decoding to a plurality of individual encoded spectral coefficients or groups of encoded spectral coefficients based on the spacing value, wherein the plurality of individual encoded spectral coefficients or groups of encoded spectral coefficients to which predictive decoding is applied are selected based on the spacing value, wherein the spacing value indicates those plurality of individual encoded spectral coefficients or groups of encoded spectral coefficients which represent at least two harmonic signal components of the audio signal when said computer program is run by a computer.

48. An encoder for encoding an audio signal, wherein the encoder comprises a processor operable to execute computer program instructions and a memory operable to store computer program instructions executable by the processor, for performing the steps of encoding the audio signal in a transform domain or filter-bank domain, determining spectral coefficients of the audio signal for a current frame and at least one previous frame, determining a spacing value, wherein the spacing value is a harmonic spacing value describing a spacing between harmonics, selectively applying predictive encoding to a plurality of individual spectral coefficients or groups of spectral coefficients based on the spacing value, selecting the plurality of individual spectral coefficients or groups of spectral coefficients to which predictive encoding is applied based on the spacing value;

selecting individual spectral coefficients or groups of spectral coefficients spectrally arranged according to a harmonic grid defined by the spacing value for a predictive encoding.

49. A decoder for decoding an encoded audio signal to produce a decoded audio signal, wherein the decoder comprises a processor operable to execute computer program instructions and a memory operable to store computer program instructions executable by the processor, for performing the steps of:

decoding the encoded audio signal in a transform domain or filter-bank domain;

acquiring a spacing value, wherein the spacing value is a harmonic spacing value describing a spacing between harmonics;

parsing the encoded audio signal to acquire encoded spectral coefficients of the audio signal for a current frame and at least one previous frame;

selectively applying predictive decoding to a plurality of individual encoded spectral coefficients or groups of encoded spectral coefficients based on the spacing value;

selecting the plurality of individual encoded spectral coefficients or groups of encoded spectral coefficients to which predictive decoding is applied based on the spacing value;

selecting individual spectral coefficients or groups of spectral coefficients spectrally arranged according to a harmonic grid defined by the spacing value for a predictive decoding.

\* \* \* \* \*